US011032532B2

(12) United States Patent
Enriquez et al.

(10) Patent No.: US 11,032,532 B2
(45) Date of Patent: Jun. 8, 2021

(54) ELECTRONIC DEVICE AND METHOD FOR PROVIDING VIRTUAL DEVICE VIA AT LEAST PORTION OF CONTENT

(71) Applicant: SAMSUNG ELECTRONICS CO., LTD., Suwon-si (KR)

(72) Inventors: John Patrick Enriquez, Metro Manila (PH); Miguel Paolo Quijano, Quezon (PH); Anna Clarissa Ramos, Parañaque (PH); Carl Justin De Guia, Rizal (PH); Gia Coleen Briones, Taguig (PH); Mark Christian Agustin, Las Piñas (PH); Neil Jonathan Joaquin, Taguig (PH)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/592,361

(22) Filed: Oct. 3, 2019

(65) Prior Publication Data
US 2020/0112711 A1 Apr. 9, 2020

(30) Foreign Application Priority Data

Oct. 4, 2018 (PH) .............................. 1-2018-000297
Jul. 15, 2019 (KR) ......................... 10-2019-0085205

(51) Int. Cl.
*G06T 19/00* (2011.01)
*G06F 3/0346* (2013.01)
(Continued)

(52) U.S. Cl.
CPC ............ *H04N 13/183* (2018.05); *G02B 27/01* (2013.01); *G06F 1/163* (2013.01); *G06F 3/011* (2013.01);
(Continued)

(58) Field of Classification Search
CPC ........ G06F 3/011; G06F 1/163; G06F 3/0481; H04M 1/0266; H04M 1/05; H04M 1/6041;
(Continued)

(56) References Cited

U.S. PATENT DOCUMENTS 9,551,873 B2   1/2017   Zalewski
9,606,363 B2   3/2017   Zalewski
(Continued)

FOREIGN PATENT DOCUMENTS

CN   206045374 U   3/2017
CN   106790996 A   5/2017
(Continued)

*Primary Examiner* — Jin Cheng Wang
(74) *Attorney, Agent, or Firm* — Sughrue Mion, PLLC

(57) ABSTRACT

Provided is a method, performed by an electronic device, of providing a virtual device associated with the electronic device, via at least a portion of content displayed on the electronic device, the method including: displaying virtual reality content, on a display of the electronic device; generating the virtual device for controlling at least one function of the electronic device; displaying the generated virtual device in such a way that the generated virtual device overlaps at least a portion of the virtual reality content; and performing the at least one function of the electronic device, based on a user input with respect to the virtual device.

16 Claims, 17 Drawing Sheets

(51) Int. Cl.
*G06F 3/0481* (2013.01)
*G06F 3/0484* (2013.01)
*G06F 3/0488* (2013.01)
*G02B 27/01* (2006.01)
*G06F 3/01* (2006.01)
*H04N 13/183* (2018.01)
*H04M 1/60* (2006.01)
*H04N 13/178* (2018.01)
*G06F 1/16* (2006.01)
*H04N 13/332* (2018.01)

(52) U.S. Cl.
CPC .......... *G06F 3/0481* (2013.01); *G06T 19/006* (2013.01); *H04M 1/6041* (2013.01); *H04N 13/178* (2018.05); *H04N 13/332* (2018.05); *G02B 2027/0178* (2013.01); *G02B 2027/0187* (2013.01)

(58) Field of Classification Search
CPC . H04M 1/72522; H04N 13/332; H04N 3/344; H04N 13/183; H04N 13/178; H04N 13/117; G02B 2027/0178; G02B 2027/0187; G02B 27/01; G06T 19/006
See application file for complete search history.

(56) References Cited

U.S. PATENT DOCUMENTS

| | | | |
|---|---|---|---|
| 9,692,855 | B2 | 7/2017 | Sharma et al. |
| 9,824,498 | B2 | 11/2017 | Mallinson |
| 2015/0253574 | A1 | 9/2015 | Thurber |
| 2016/0180845 | A1* | 6/2016 | Kim .................. H04M 1/72555 348/211.2 |
| 2016/0328021 | A1* | 11/2016 | Lee ....................... G06F 3/0304 |
| 2016/0335801 | A1* | 11/2016 | Yoon .................... G06F 3/04842 |
| 2016/0337612 | A1* | 11/2016 | Im .......................... H04N 5/232 |
| 2016/0343344 | A1* | 11/2016 | Chae ..................... G06T 19/006 |
| 2017/0003858 | A1 | 1/2017 | Kocharlakota |
| 2017/0115728 | A1* | 4/2017 | Park ..................... G06F 3/0482 |
| 2018/0107360 | A1* | 4/2018 | Kim ..................... G06F 3/0416 |
| 2018/0275749 | A1* | 9/2018 | Yoon ..................... G02B 27/01 |
| 2018/0288391 | A1* | 10/2018 | Lee .......................... G06F 3/041 |
| 2018/0321493 | A1* | 11/2018 | Kim .................... G02B 27/017 |
| 2019/0065026 | A1* | 2/2019 | Kiemele ............ G02B 27/0172 |

FOREIGN PATENT DOCUMENTS

| | | |
|---|---|---|
| EP | 2336847 A1 | 6/2011 |
| EP | 3093743 A1 | 11/2016 |
| WO | 2016118606 A1 | 7/2016 |

* cited by examiner

ELECTRONIC DEVICE AND METHOD FOR PROVIDING VIRTUAL DEVICE VIA AT LEAST PORTION OF CONTENT

CROSS-REFERENCE TO RELATED APPLICATIONS

This application is based on and claims priority under 35 U.S.C. § 119 to Philippine Patent Application No. 1-2018-000297, filed on Oct. 4, 2018, in the Philippine Intellectual Property Office, and Korean Patent Application No. 10-2019-0085205, filed on Jul. 15, 2019, in the Korean Intellectual Property Office, the disclosures of which are hereby incorporated by reference herein in their entireties.

BACKGROUND

1. Field

The disclosure relates to emulation and relates to an electronic device for providing a virtual device associated with an electronic device via at least a portion of content displayed on the electronic device, and more particularly, to an electronic device for providing virtual reality (VR) content and an operating method of the electronic device.

2. Description of Related Art

As the performance of hardware has developed, virtual reality (VR) technology has also been actively researched. Hardware products capable of supporting various VR services have been developed, from low cost products to products providing more complex functions, and consumer demand for these hardware products has continually increased. In general, VR technology may frequently use electronic devices, such as client computing devices, such as smart phones, or mobile computing devices (MCDs), as main components, or as host computing devices for providing a VR experience.

Electronic devices supporting a VR service may be mounted on a compatible point interaction device, such as a head-mounted display (HMD) device or a virtual reality headset (VRH). The HMD device may be mapped to content that is output through a display of a MCD by using at least one lens inside the HMD device, and a user of the electronic device may be immersed, via the content, in a complete VR environment including at least one of VR, augmented reality (AR), or mixed reality (MR) provided from the electronic device mounted on the HMD device.

When the electronic device performing the function of a host computing device is the MCD, which is different from a desktop computer or a laptop computer that is in general connected to the HMD device by using long cables, wired cables for supplying power are not required. Thus, a user may freely experience the VR environment without obstacles or restrictions in a physical environment. In order to interact with the content provided in the environment including at least one of the AR, the VR, or the MR, users may use various input devices included in the HMD device or the electronic device coupled to the HMD device.

For example, users may use at least one user input device included in the HMD device or the electronic device coupled to the HMD device, to control virtual objects provided in the content in the environment including at least one of the AR, the VR, or the MR. Also, users may use various user input devices included in the HMD device or the electronic device coupled to the HMD device, to perform various functions provided from the HMD device or the electronic device, regardless of the VR content.

However, when the users of the electronic device mounted on the HMD device are immersed in the environment including the VR, the users may not be accustomed to controlling the virtual objects by using the user input devices of the electronic device. Thus, unintended instructions may be input to the electronic device. As a result, multiple threads may be executed resulting in malfunctions in the electronic device. Specifically, unlike a desktop computer or a laptop computer including hardware components having excellent performance, the MCDs mounted on the HMD device and having relatively weak performance may have a higher probability of the occurrence of stuck threads. Thus, more processing resources may be consumed, to reduce the speed of the operation of the electronic device to provide the content for the VR.

Also, when general functions (for example, transmission of text messages, camera capturing, etc.) of the electronic device have to be performed when the electronic device is providing the VR content, the user has to use the general functions after ending the function of the electronic device to provide the VR content. In other words, the user of the electronic device has many restrictions in using the general functions of the electronic device, when the user is immersed in the VR content. Thus, it is required to develop technology to effectively control the functions of the electronic device providing VR.

SUMMARY

The disclosure provides an electronic device for providing a virtual device associated with the electronic device, via at least a portion of content displayed on the electronic device, and an operating method of the electronic device.

More particularly, provided are an electronic device and method for providing a virtual device for controlling at least one function of the electronic device, via at least a portion of content.

Additional aspects will be set forth in part in the description which follows and, in part, will be apparent from the description, or may be learned by practice of the presented embodiments of the disclosure.

According to an embodiment of the disclosure, a method, performed by an electronic device, of providing a virtual device associated with the electronic device, via at least a portion of content displayed on the electronic device, includes: displaying the content, which is for virtual reality, on a display of the electronic device; generating the virtual device for controlling at least one function of the electronic device; displaying the generated virtual device in such a way that the generated virtual device overlaps the at least a portion of the content; and performing the at least one function of the electronic device, based on a user input with respect to the virtual device.

According to another embodiment of the disclosure, an electronic device for providing a virtual device via at least a portion of content may include: a display; a communication interface; a memory storing one or more instructions; and at least one processor configured to execute the one or more instructions, wherein the at least one processor is configured to execute the one or more instructions to: display the content, which is for virtual reality, via the display; generate the virtual device for controlling at least one function of the electronic device; display the generated virtual device in such a way that the generated virtual device overlaps the at least a portion of the content; and perform the at least one function of the electronic device, based on a user input with respect to the virtual device.

According to another embodiment of the disclosure, a computer program device includes a recording medium in which a program is stored, the program being configured to: display, via an electronic device, content for virtual reality on a display of the electronic device; generate a virtual device for controlling at least one function of the electronic device; display the generated virtual device in such a way that the generated virtual device overlaps at least a portion of the content; and perform the at least one function of the electronic device based on a user input for manipulating the virtual device.

According to another embodiment of the disclosure, a computing system includes an electronic device (for example, a mobile computing device) mounted on a head mounted display (HMD) device or a virtual head set (VRH) and electrically connected to the HMD device or the VRH.

The computing system may include: at least one processor coupled to the electronic device and capable of communicating with the HMD device; an interface component including at least one hardware component capable of visual representation and at least one software component capable of being emulated in a virtual environment of the HMD device, capable of communicating with the electronic device and the HMD device, and related to the at least one processor; a computer-readable recording medium coupled by the at least one processor, the computer-readable recording medium including instructions for the electronic device to execute a method of integrating at least one interactive multi-dimensional virtual device model to the virtual environment; and an input interface coupled to the HMD device via the interface component, capable of communicating with the at least one processor, and configured to detect at least one event based on a user input received via a virtual device in the virtual environment, generate a signal related to the detected at least one event, and identify whether or not the generated signal matches a predetermined reference corresponding to the detected at least one event, wherein based on the generated signal matching the predetermined reference, the generated signal may be simultaneously processed by the at least one processor in the electronic device and the virtual environment, wherein the virtual device may be displayed in such a way that the virtual device overlaps content for virtual reality generated by the electronic device.

The computing system may identify whether or not the generated signal matches the predetermined reference, based on at least one device model of the electronic device and a device identifier for identifying metadata of the electronic device.

One or more input instructions (for example, in-app instructions) provided from the electronic device to the HMD device may change (or display) content in virtual reality provided via the HMD device and cause the electronic device to perform a least one operation.

The electronic device may provide a virtual device visually rendered and emulated in the content, which is for virtual reality, as a virtual reality device (VRD) associated with the electronic device, and the virtual device may be displayed on a screen of the electronic device in such a way that the virtual device overlaps a portion of the content, which is for virtual reality.

A user may transmit various input instructions provided from the electronic device to the HMD device by manipulating the virtual device provided via the at least a portion of the content of the electronic device.

The disclosure also provides a method comprising: displaying virtual reality content on a display of an electronic device; generating the virtual device for controlling at least one function of the electronic device; displaying the generated virtual device in such a way that the generated virtual device overlaps at least a portion of the virtual reality content; and performing the at least one function of the electronic device, based on a user input with respect to the virtual device.

According to an embodiment, the electronic device may at least one of: be mounted on an external device including at least one lens, be electrically connected to the external device via a connection port of the external device, or be configured to transmit at least information related to the virtual reality content to the external device.

According to an embodiment, the generating of the virtual device may comprise: obtaining a user input for generating the virtual device; identifying a virtual device model corresponding to metadata of the electronic device, from among one or more pre-stored virtual device models, based on the user input for generating the virtual device; and generating the virtual device by using the identified virtual device model.

According to an embodiment, the generating of the virtual device may comprise: Identifying whether or not the electronic device is connected to the external device via the connection port of the external device; and based on identifying that the electronic device is connected to the external device, generating the virtual device based on the user input for generating the virtual device.

According to an embodiment, the performing of the at least one function of the electronic device may comprise: obtaining a voice call request from another electronic device connected to the electronic device; based on the obtained voice call request, displaying a pre-set telephone call image on a screen of the virtual device and simultaneously outputting a notification signal with respect to the voice call request to the external device; and performing the at least one function of the electronic device related to a voice call, based on a user input for accepting the voice call request.

According to an embodiment, the performing of the at least one function of the electronic device may comprise: obtaining a user input for sharing call content of the voice call with other virtual devices in virtual reality; identifying the other virtual devices that are located within a range of a certain distance from the virtual device corresponding to the electronic device; and transmitting information about the call content to the identified other virtual devices.

According to an embodiment, the performing of the at least one function of the electronic device may comprise: obtaining a user input for selecting a camera application displayed on a screen of the virtual device; executing the camera application based on the user input for selecting the camera application; and displaying the at least a portion of the virtual reality content, which is to be captured based on the virtual device, on the screen of the virtual device, as a captured virtual image. Displaying may include a processor causing a display of the electronic device to display.

According to an embodiment, the performing of the at least one function of the electronic device may comprise: obtaining a user input for selecting a message application displayed on a screen of the virtual device; executing the message application pre-stored in the electronic device based on the user input for selecting the message application; and displaying, on the screen of the virtual device, text instructed by a graphical user interface (GUI) for obtaining text.

According to an embodiment, the virtual device may at least one of: be rendered in virtual reality in a form corresponding to the electronic device or be configured to display a graphical user interface (GUI) corresponding to a GUI of the electronic device, on a screen of the virtual device.

According to an embodiment, the at least one function of the electronic device may be executed, based on the user input with respect to the virtual device, in the electronic device. The execution may be together with the operation of displaying, via the display of the electronic device, the virtual reality content.

According to an embodiment of the disclosure, an electronic device may comprise: a communication interface; a memory storing one or more instructions; and at least one processor configured to execute the one or more instructions to: cause a display to display virtual reality content; generate the virtual device for controlling at least one function of the electronic device; cause the display to display the generated virtual device in such a way that the generated virtual device overlaps at least a portion of the virtual reality content; and perform the at least one function of the electronic device, based on a user input with respect to the virtual device.

According to an embodiment, a non-transitory computer readable medium may comprise computer program instructions, which, when executed by a processor of an electronic device, causes the processor to: cause a display of the electronic device to display virtual reality content; generate a virtual device for controlling at least one function of the electronic device; cause the display to display the generated virtual device in such a way that the generated virtual device overlaps at least a portion of the virtual reality content; and perform the at least one function of the electronic device based on a user input for manipulating the virtual device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
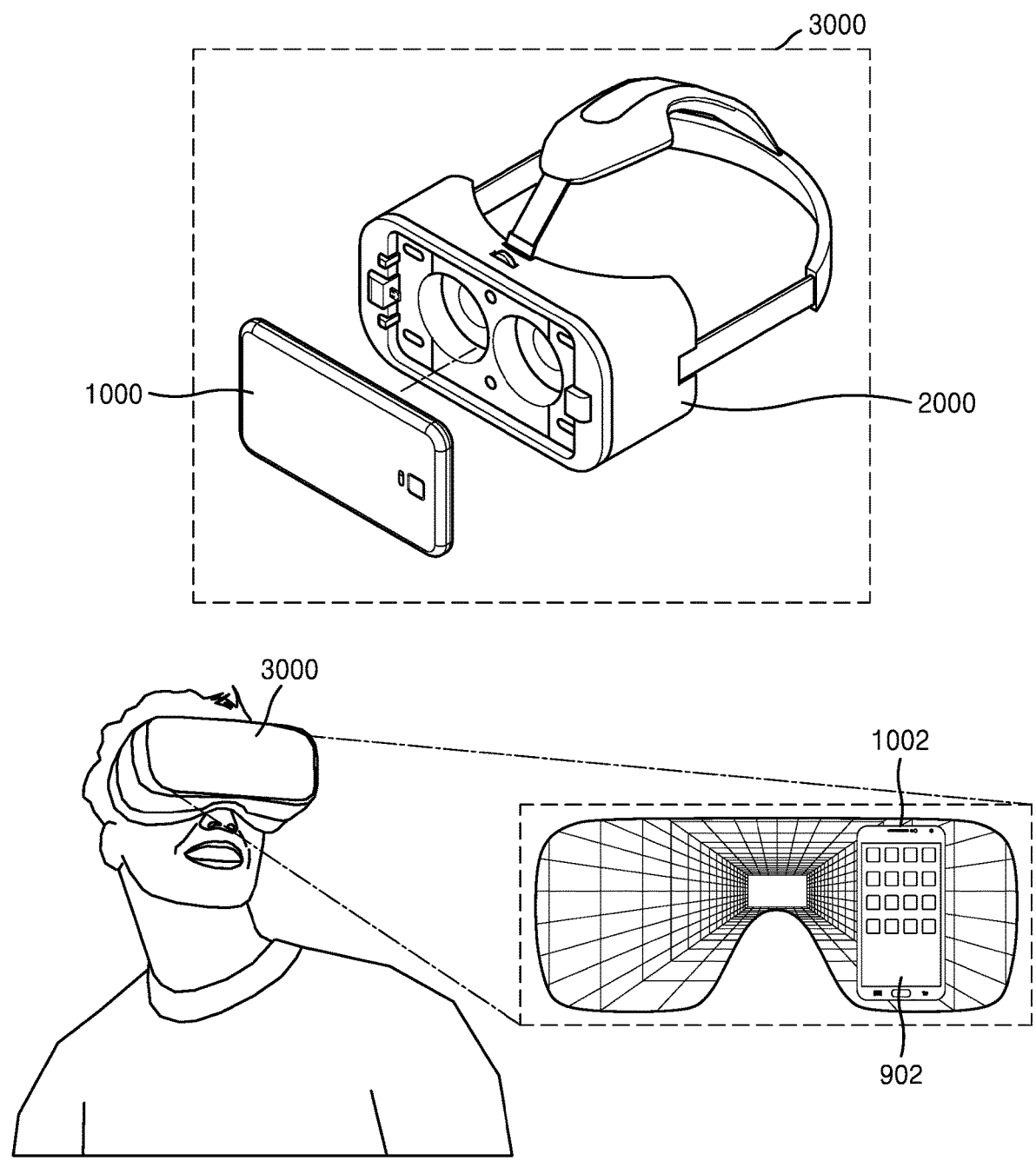
FIG. 1 shows a schematic view of a computing system including an external device and an electronic device mounted on the external device and electrically connected to the external device, according to an embodiment of the disclosure.

The terms used in this specification will be briefly described and embodiments of the disclosure will be described in detail.

The terms used in the disclosure are selected from among common terms that are currently widely used in consideration of their function in the disclosure. However, the terms may be different according to an intention of one of ordinary skill in the art, a precedent, or the advent of new technology. Also, in particular cases, the terms are discretionally selected by the applicant of the disclosure, and the meaning of those terms will be described in detail in the corresponding part of the detailed description. Therefore, the terms used in the disclosure are not merely designations of the terms, but the terms are defined based on the meaning of the terms and content throughout the disclosure.

Throughout the specification, when a part "includes" an element, it is to be understood that the part additionally includes other elements rather than excluding other elements as long as there is no particular opposing recitation. Also, the terms described in the specification, such as "unit," "module," etc., denote a unit processing at least one function or operation, which may be implemented as hardware (e.g., a hardware processor) or software or a combination thereof.

Hereinafter, embodiments of the disclosure will now be described more fully with reference to the accompanying drawings for one of ordinary skill in the art to be able to perform the disclosure without any difficulty. The disclosure may, however, be embodied in many different forms and should not be construed as being limited to the embodiments of the disclosure set forth herein. Also, parts in the drawings unrelated to the detailed description are omitted to ensure clarity of the disclosure. Like reference numerals in the drawings denote like elements.

Throughout the disclosure, the expression "at least one of a, b, or c" indicates only a, only b, only c, both a and b, both a and c, both b and c, or all of a, b, and c, or variations thereof.

FIG. 1 shows a schematic view of a computing system 3000 including an external device 2000 and an electronic device 1000 mounted on the external device 2000 and electrically connected to the external device 2000, according to an embodiment of the disclosure.

According to an embodiment of the disclosure, the computing system 3000 may include the electronic device 1000 and the external device 2000. For example, the computing system 3000 may provide content for virtual reality (VR) provided from the electronic device 1000 to a user, via the external device 2000, so that the user may experience an immersive virtual environment.

According to an embodiment of the disclosure, the virtual environment may include at least one of VR, augmented reality (AR), or mixed reality (MR) generated based on the content. For example, the virtual environment may denote a visualized immersive spatial environment for allowing a sensing experience (for example, visual, audial, haptic, etc., experiences), such as experiencing of a physical space. According to an embodiment of the disclosure, the VR, the AR, or the MR may denote a virtual environment artificially generated by using a computing device, which is similar to an actual environment, or computing technology for generating the virtual environment. Actual physical objects may be simulated in a digital way in the virtual environment, so as to be interacted with by a user and to provide a sensing experience to the user.

According to an embodiment of the disclosure, the MR may denote computing technology for overlapping between an actual world and a digital or virtual object, and the AR may denote computing technology for enabling at least one combination among three-dimensional (3D) visualization, multi-modal interaction, animation, or direct manipulation.

According to an embodiment of the disclosure, the electronic device 1000 may generate the virtual environment by visualizing multi-dimensional data in a multi-dimensional space by using an interactive multi-dimensional application model.

According to an embodiment of the disclosure, the interactive multi-dimensional application model may be based on at least one of an AR model, a VR model, or a MR model. The interactive multi-dimensional application model may be generated by at least one of: pixel-based visualization, a short term discrete Fourier transform, a discrete cosine transform (DCT), a discrete Hartley transform (DHT), a Walsh-Hadamard transform (WHT), or another transform. The electronic device 1000 may visualize the multi-dimensional data in the multi-dimensional space by using the interactive multi-dimensional application model generating data construction, based on an analysis of similarity or non-similarity with respect to data of given objects.

According to an embodiment of the disclosure, the electronic device 1000 may include a mobile computing device (MCD). The electronic device 1000 may be physically mounted to the external device 2000 and may be connected to the external device 2000 in a wired or wireless manner, thereby being able to provide a user with the content for the virtual environment including at least one of the VR, the MR, or the AR, via the external device 2000. The external device 2000 may be an HMD that may be configured to be mounted on a head of a user. The electronic device 1000 may output the content for the VR on a screen of the electronic device 1000 and at the same time, may transmit, to the external device 2000, information about at least a portion of the content displayed on the electronic device 1000.

That is, the electronic device 1000 may be mounted on the external device 2000, which may include at least one lens, may be electrically connected to the external device 2000 via, for example, a connection port of the external device 2000, and may transmit the information about the at least a portion of the content to the external device 2000.

For example, as shown in FIG. 1, the electronic device 1000 may provide, on the display of the electronic device 1000, the content for the virtual environment including at least one of the VR, the MR, or the AR, and at the same time (simultaneously), may display a virtual device (VD) 1002 associated with the electronic device 1000 in an overlapping manner with respect to the provided content for the virtual environment. In other words, as shown in FIG. 1, the VD 1002 may be superimposed on the VR, the MR or the AR on the display of the electronic device 1000. While the user of the electronic device 1000 is immersed in the content for the virtual environment provided by the electronic device 10000, the user may also view the VD 1002 provided by the electronic device 1000, via the external device 2000, which may include the at least one lens.

According to an embodiment of the disclosure, the VD 1002 provided by the electronic device 1000 may be rendered in the VR in the form corresponding to the electronic device 1000, and the electronic device 1000 may display, on a screen of the VD 1002, a graphics user interface (GUI) corresponding to a GUI of the electronic device 1000. According to an embodiment of the disclosure, the VD (Virtual Device) 1002 may be rendered in the virtual reality as at least one VD (Virtual Device) images corresponding to a form of the electronic device. In other words, the virtual device may comprises an image or a virtual object rendered in the VR in the form of the electronic device. According to an embodiment of the disclosure, a screen 902 of the electronic device 1000 may be displayed on the screen of the VD 1002. The screen 902 may correspond to a screen displayed on the electronic device 1000 while the electronic device 1000 is not providing content for a virtual environment. The screen 902 may include the GUI of the electronic device.

According to an embodiment of the disclosure, methods related to manipulation of the electronic device 1000 while the electronic device is not providing content for a virtual environment may be uniformly applied in the VD 1002 generated by the electronic device 1000 and the user of the electronic device 1000 may use the same methods as the methods related to the manipulation of the electronic device 1000 while the electronic device is not providing content for a virtual environment to control the VD 1002. According to an embodiment of the disclosure, the VD 1002 may be rendered in the VR in the form corresponding to the electronic device 1000, and thus, buttons of the electronic device 1000 may also be rendered in the form in which the buttons are at least partially included in the VD 1002. Thus, for example, the user of the electronic device 1000 may click on a volume down button from among buttons of the VD 1002, to actually reduce the volume of the electronic device 1000.

For example, the electronic device 1000 may generate the VD 1002 and display the generated VD 1002 such that the generated VD 1002 overlaps at least a portion of the content for the virtual environment. According to an embodiment of the disclosure, the electronic device 1000 may generate a virtual device image for controlling at least one function of the electronic device and display a virtual device image in such a way that the virtual device image overlaps at least a portion of the virtual reality content.

Also, when the electronic device 1000 does not provide the content for the virtual environment, the electronic device 1000 may display the GUI included in the screen of the electronic device 1000, the GUI may generally include a plurality of application icons, on the screen of the VD 1002.

The electronic device 1000 according to an embodiment of the disclosure may be realized in various forms. For example, the electronic device 1000 described in this specification may include, but is not limited to, one or more of: a digital camera, a mobile terminal, a smartphone, a laptop computer, a tablet computer, a personal computer (PC), an electronic book terminal, a digital broadcasting terminal, a personal digital assistant (PDA), a portable multimedia player (PMP), a navigation apparatus, or a Moving Picture Experts Group (MPEG) Audio Layer-3 (MP3) player.

The electronic device 1000 described in this specification may be a device wearable by a user. The wearable device may include at least one of an accessory-type device (for example, a watch, a ring, a bracelet, an anklet, a necklace, glasses, or contact lenses) a head-mounted display (HMD) device, a fabric or clothing-integral device (e.g., electronic clothing), a body-mounted-device (e.g., a skin pad), or a biometric transplant device (e.g., an implantable circuit), but is not limited thereto. Hereinafter, for convenience of explanation, an example in which the electronic device 1000 is a smartphone will be described.

According to an embodiment of the disclosure, the external device 2000 may provide a user with a virtual environment including at least one of VR, MR, or AR. For example, the external device 2000 may be a VR device (VRD) and may include an HMD device or a VR headset (VRH). The external device 2000 may be an integral-type VRD integrated with the additional electronic device 1000 and capable of providing content for the VR to a user, but is not limited thereto. The external device 2000 may be a stand-alone VRD capable of providing content for the VR to a user, without a need to be integrated with the additional electronic device 1000. Hereinafter, for convenience, an example in which the external device 2000 is integrated with the electronic device 1000 and provides the content for the VR will be described.

According to an embodiment of the disclosure, the external device 2000 may include at least one lens. The at least one lens may include two lenses corresponding to locations of both eyes of a user, when the user wears the external device 2000. According to an embodiment of the disclosure, the at least one lens (e.g., two lenses) fixed to correspond to the location of both eyes of the user of the external device 2000 may face a screen of the display of the electronic device 1000, in an opposite direction from a direction in which the at least one lens may face the both eyes of the user of the external device 2000. Thus, the user of the external device 2000 may view the content for the virtual environment provided by the electronic device 1000 via the lens of the external device 2000.

According to an embodiment of the disclosure, the external device 2000 may include a display including the at least one lens. The external device may obtain the content for the virtual environment provided from the electronic device 1000, and provide the received content to the user via the display of the external device 2000. Further, (e.g., via the connection port), the external device 2000 may obtain, from the electronic device 1000, information (for example, audio information included in the content for the virtual environment) related to at least a portion of the content for the virtual environment, may provide, to the display thereof, the content for the virtual environment received from the electronic device 1000, and may output the obtained information related to the at least a portion of the content, such as, outputting the audio information to a speaker.

According to an embodiment of the disclosure, the external device 2000 may further include one or more of: at least one strap for fixing the external device 2000 to a head of the user, a fastening portion for fixing the electronic device 1000 to the external device 2000, and/or the connection port for transmitting and obtaining the information related to the content or information about various detection values to and from the electronic device 1000.

Figure 2:
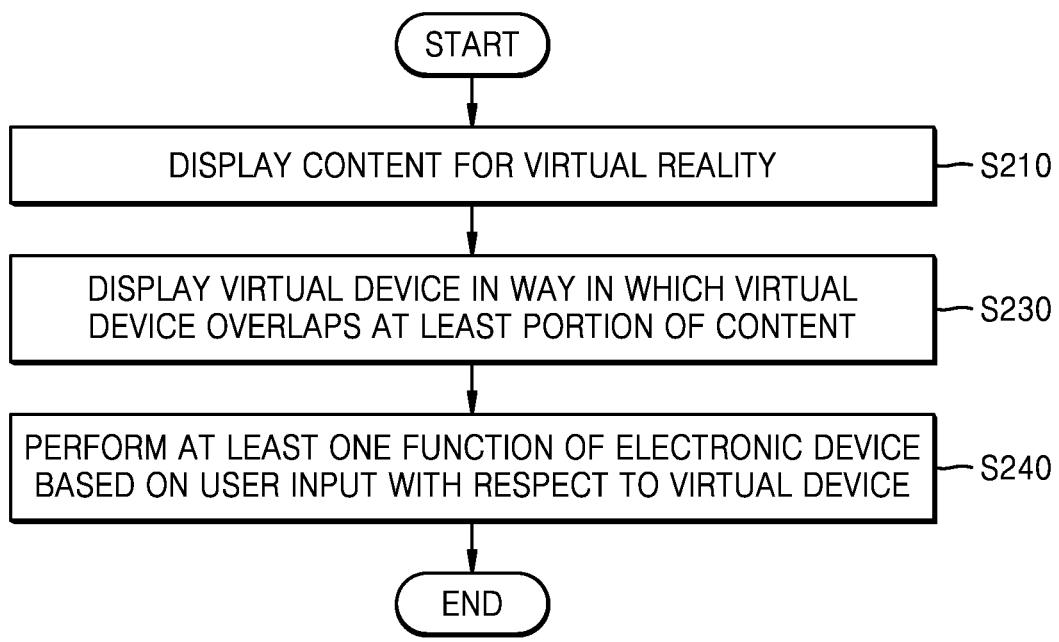
FIG. 2 shows a flowchart of a method, performed by an electronic device, of providing a virtual device associated with the electronic device, via at least a portion of content displayed on the electronic device, according to an embodiment of the disclosure.

FIG. 2 shows a flowchart of a method, which may be performed by the electronic device 1000, of providing the VD 1002 associated with the electronic device 1000, via at least a portion of content displayed on the electronic device 1000, according to an embodiment of the disclosure.

In operation S210, the electronic device 1000 may display content for VR. According to an embodiment of the disclosure, the electronic device 1000 may display content for VR, but content for any virtual environment may be displayed. The virtual environment may include at least one of VR, AR, or MR. According to an embodiment of the disclosure, the electronic device 1000 may display the content for the VR on a display of the electronic device 1000 and may simultaneously transmit information about at least a portion of the content to the external device 2000. According to an embodiment of the disclosure, the information about the at least a portion of the content may include at least one of audio information or visual information for reproducing the content.

For example, the electronic device 1000 may be electrically connected to the external device 2000 via the connection port of the external device 2000. The electronic device 1000 may display the content for the virtual environment on the display of the electronic device 1000 and may simultaneously transmit the at least one of the audio information or the visual information related to the content to the external device 2000.

According to an embodiment, the electronic device 1000 may generate the VD 1002 for controlling at least a function of the electronic device 1000. For example, the electronic device 1000 may render the VD 1002 in the VR in the form corresponding to the electronic device 1000. Also, the electronic device 1000 may display a GUI corresponding to a GUI of the electronic device 1000 (e.g., a GUI of the electronic device 1000 while the electronic device 1000 is not providing a virtual environment (in normal use) on a screen of the VD 1002. For example, the VD 1002 may be a virtualized electronic device and may be displayed on at least a portion of the content for the VR provided by the electronic device 1000. A user of the electronic device 1000 may execute the at least one function of the electronic device 1000 by using the VD 1002.

According to an embodiment of the disclosure, the operation, performed by the electronic device 1000, of generating the VD 1002 associated with the electronic device 1000, may correspond to an operation, performed by the electronic device 1000, of emulating the electronic device 1000 in a virtual environment, to perform the at least one function of the electronic device 1000. For example, the operation, performed by the electronic device 1000, of emulating the electronic device 1000 may denote an operation of generating software components corresponding to at least one or more of hardware components and software components of the electronic device 1000, by emulating the hardware components of the electronic device 1000 and the software components corresponding to the hardware components. That is, the electronic device 1000 may generate the VD 1002 for performing a function corresponding to the at least one function of the electronic device 1000, so that the generated VD 1002 operates like the electronic device 1000 in the virtual environment. That is, according to an embodiment of the disclosure, the VD 1002 may be an emulated device generated by emulating the hardware components of the electronic device 1000 or the software components corresponding to the hardware components, and may operate as a virtual user interface for controlling the at least one function of the electronic device 1000.

In operation S230, the electronic device 1000 may display the generated VD 1002 in such a way that the generated VD 1002 is displayed to overlap at least a portion of the content of the virtual environment. For example, the electronic device 1000 may change the content for the VR, such that the VD 1002 is displayed in the virtual environment generated based on the content for the VR. The content generated by the electronic device 1000 may include the content for the VR and image, video, or audio data associated with the VD 1002.

In operation S240, the electronic device 1000 may perform the at least one function of the electronic device 1000 based a user input with respect to the VD 1002. For example, the electronic device 1000 may include at least one sensor that detects a motion of a user, may identify motion information by detecting the motion of the user while the user is immersed in the virtual environment, based on at least one detection value obtained from the at least one sensor, and may, based on the identified motion information, identify the user input with respect to the VD 1002 displayed in an overlapping manner with respect to the content. According to an embodiment of the disclosure, the at least one function of the electronic device 1000 executed based on the user input with respect to the VD 1002 may be executed by the electronic device 1000 along with the operation of displaying the content for the VR via the display of the electronic device 1000.

Figure 3:
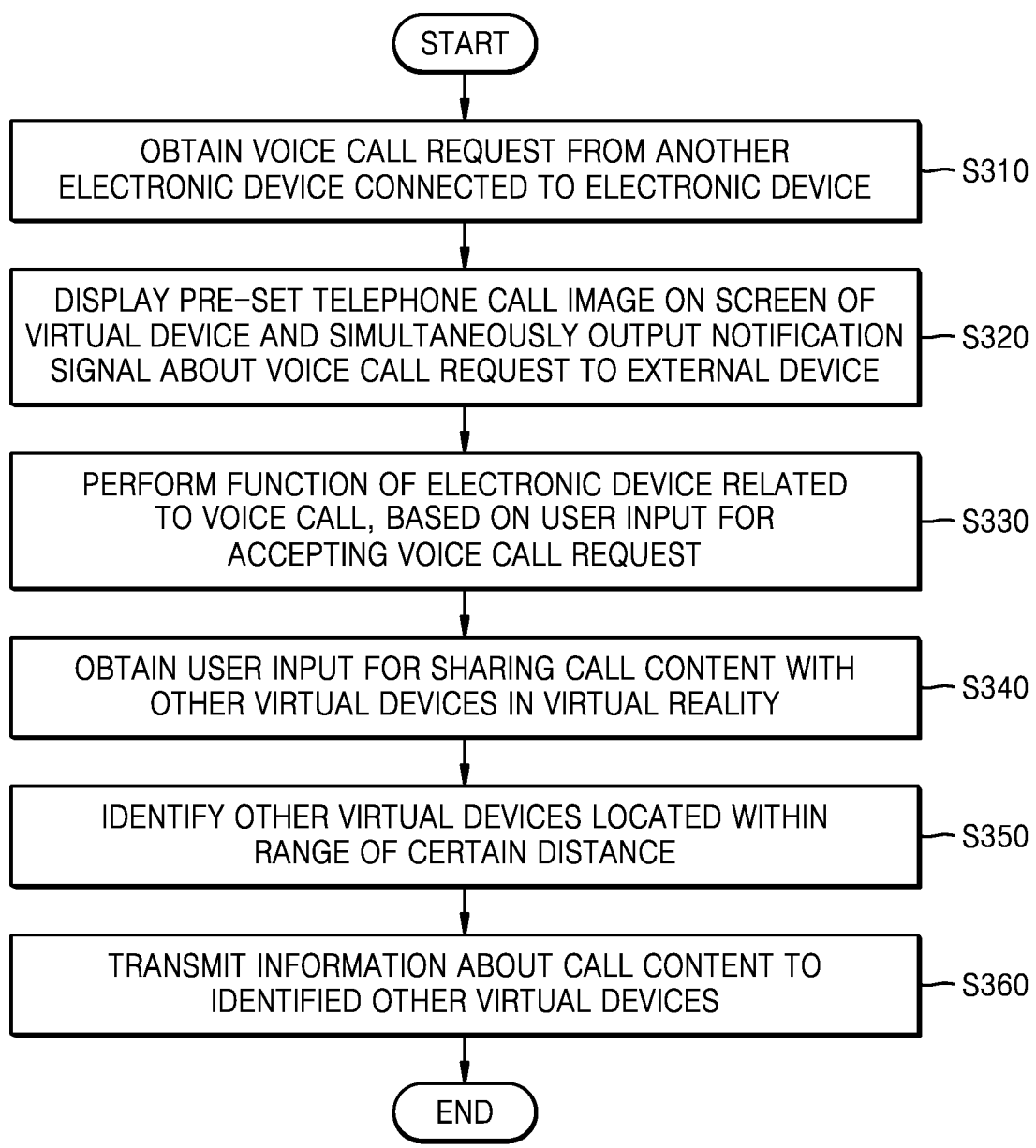
FIG. 3 shows a flowchart of a method, performed by an electronic device, of performing, via a virtual device, a function of the electronic device, which is related to a voice call, according to an embodiment of the disclosure.

FIG. 3 shows a flowchart of a method, which may be performed by the electronic device 1000, of performing, via the VD 1002, a function of the electronic device 1000 that is related to a voice call, according to an embodiment of the disclosure.

In operation S310, the electronic device 1000 may obtain a voice call request from another electronic device connected to the electronic device 1000. For example, the electronic device 1000 may be connected to the other electronic device registered in a mobile communication network, via the mobile communication network, and may obtain the voice call request from the other electronic device. Also, the electronic device 1000 may transmit a voice call request to the other electronic device via the mobile communication network.

In operation S320, based on the obtained voice call request, the electronic device 1000 may display a pre-set telephone call image on a screen of the VD 1002, and may simultaneously output a notification signal about the voice call request to the external device 2000. According to an embodiment of the disclosure, the notification signal may include at least one of an audio signal or a vibration signal, but it is not limited thereto. According to an embodiment of the disclosure, the notification signal may include a signal about the content to allow an image of the VD 1002 to vibrate, the VD 1002 being displayed in such a way that the VD 1002 overlaps at least a portion of the content. According to an embodiment of the disclosure, based on the voice call request, the electronic device 1000 may output the notification signal to the external device 2000 and may simultaneously directly output the notification signal to a user.

For example, based on the voice call request being obtained, the electronic device 1000 may at least one of: display, on a display thereof, the image of the VD 1002 displayed in the overlapping manner with respect to the content for the VR such that the image of the VD 1002 vibrates, or output the sound of a bell to the electronic device 1000 or the external device 2000. Also, based on the voice call request being obtained, the electronic device 1000 may control the electronic device 1000 or the external device 2000 to vibrate.

In operation S330, the electronic device 1000 may perform the function of the electronic device 1000 that is related to the voice call, based on a user input for accepting the voice call request. For example, the electronic device 1000 may obtain a voice input of the user of the electronic device, transmit the obtained voice input of the user of the electronic device to another electronic device, and may obtain a voice input of a user of the other electronic device from the other electronic device.

According to an embodiment of the disclosure, the electronic device 1000 may identify a user input for selecting an icon for accepting the voice call request displayed on the screen of the VD 1002, based on motion information identified by detecting a motion of the user. Also, the electronic device 1000 may perform the function of the electronic device 1000 that is related to the voice call, based on the identified user input. According to an embodiment of the disclosure, the electronic device 1000 may obtain a user input for touching a user input interface of the external device 2000, the user input being made to accept the voice call request, from the external device 2000, and may perform the function of the electronic device 1000 that is related to the voice call, based on the user input obtained from the external device 2000.

In operation S340, the electronic device 1000 may obtain a user input for sharing call content of the voice call with other VDs in the VR. According to an embodiment of the disclosure, the electronic device 1000 may obtain a user input for sharing call content of the voice call with another electronic device corresponding to another VD images.

For example, when the electronic device 1000 is not mounted on the external device 2000, and based on a user input for selecting a loud speaker mode being received during the voice call, the call content may be loudly output by obtaining a sufficient speaker volume through one speaker or a plurality of speakers in the electronic device 1000. That is, the electronic device 1000 may allow the call content to be loudly output via the loud speaker mode so that the call content output from the electronic device 1000 may be directly heard by other users located within a certain distance (range) from the electronic device 1000 in the real world. The "loud speaker mode" described in this specification may denote a speaker phone call mode in which call content of a user is loudly output by using one speaker or a plurality of speakers.

According to an embodiment of the disclosure, while the user performs the function of the electronic device 1000 that is related to the voice call, in a state in which the user is immersed in the VR, the electronic device 1000 may display a loud speaker icon on the screen of the VD 1002 and may obtain a user input for selecting the loud speaker icon on the screen of the VD 1002.

In operation S350, the electronic device 1000 may identify one or more other VDs located within a range of a certain distance from the VD 1002 corresponding to the electronic device 1000. According to an embodiment of the disclosure, the electronic device 1000 may identify the one or more other VDs accessing the VR service used by the electronic device 1000 and may identify whether the one or more other VDs accessing the VR service is able to perform communication with the electronic device 1000. According to an embodiment of the disclosure, based on the user input for sharing the call content with the one or more other VDs in the VR, the electronic device 1000 may identify the one or more other VDs that are located within the range of the certain distance from the VD 1002 corresponding to the electronic device 1000 in the VR. According to an embodiment of the disclosure, the electronic device 1000 may identify another virtual device images that are located within a range of a certain distance from the virtual device image corresponding to the electronic device, and may transmitting information about the call content to the another electronic device corresponding to the identified another electronic device images.

In operation S360, the electronic device 1000 may transmit information about the call content to the identified one or more other VDs that are located within the range of the certain distance from the VD 1002. For example, the electronic device 1000 may transmit the information about the call content to the identified one or more other VDs that are within the range in the VR, to enable the identified one or more other VDs in the VR to listen to the call content of the user of the electronic device 1000, similarly to the loud speaker mode with respect to the real world. That is, based on the user input for sharing the call content with the other VDs in the VR being obtained, the electronic device 1000 may transmit the call content of the user of the electronic device 1000 to the identified one or more other VDs in the VR so that users of the identified one or more other VDs in the VR are able to listen to the call content of the electronic device 1000, regardless of intentions of the users of the identified one or more other VDs in the VR.

Figure 4:
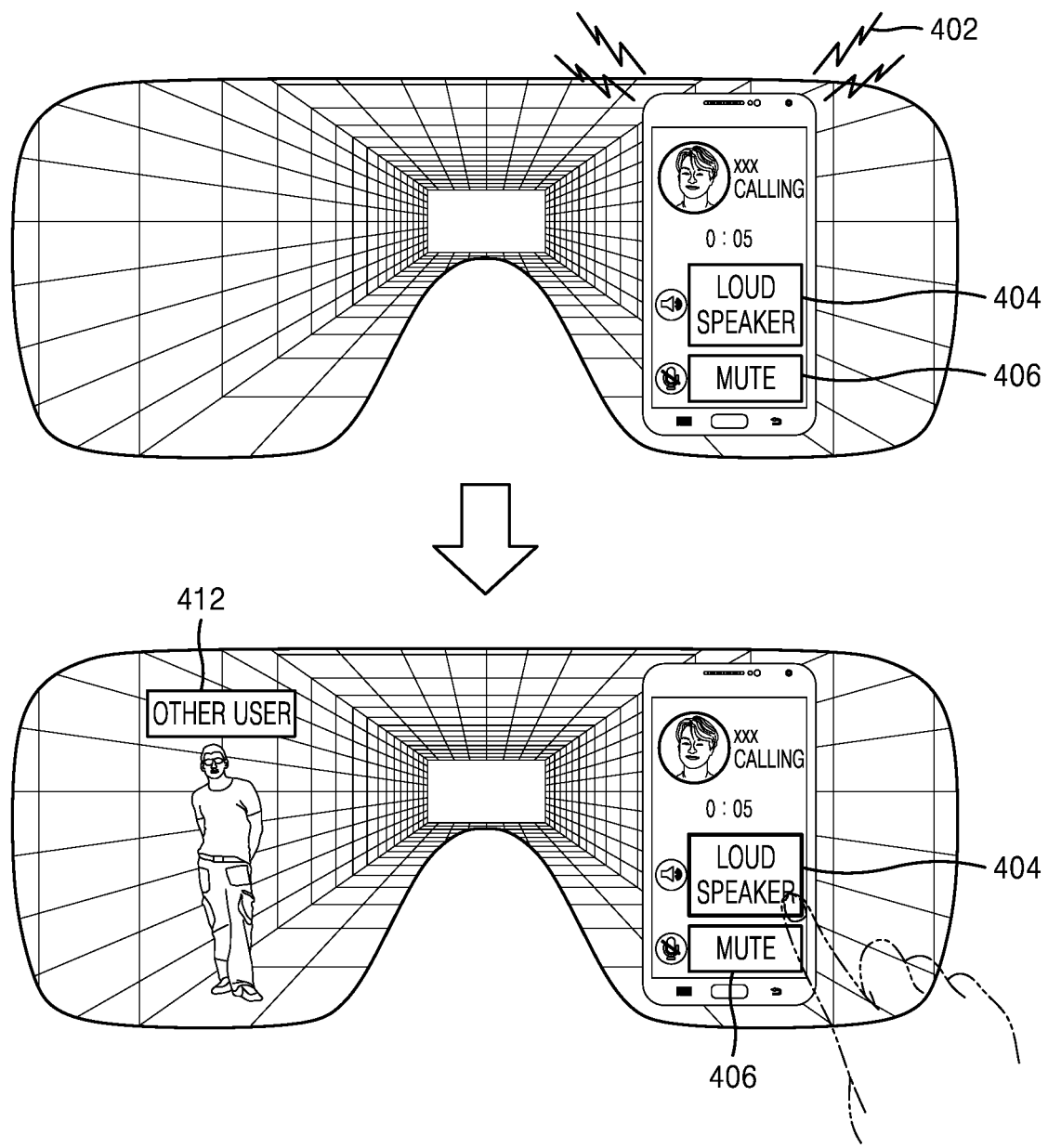
FIG. 4 shows a view for describing a method, performed by an electronic device, of performing, via a virtual device, a function of the electronic device, which is related to a voice call, according to an embodiment of the disclosure.

FIG. 4 shows a view for describing a method, performed by the electronic device 1000, of performing, via the VD 1002, a function of the electronic device that is related to a voice call, according to an embodiment of the disclosure.

The electronic device 1000 may obtain a voice call request from another electronic device connected to the electronic device 1000. Based on the voice call request being obtained from the other electronic device connected to the electronic device 1000, the electronic device 1000 may output a pre-set telephone call image on a screen of the VD 1002. The pre-set telephone call image may include at least one of a loud speaker icon 404 or a MUTE icon 406. The electronic device 1000 may simultaneously output a notification signal about the voice call request to the external device 2000.

According to an embodiment of the disclosure, based on the voice call request being obtained, the electronic device 1000 may allow an image 402 of the VD 1002 displayed in such a way that the VD 1002 overlaps the content for VR, to vibrate. A user of the electronic device 1000 may identify that the image 402 of the VD 1002 displayed in the way in which the VD 1002 overlaps the content for the VR vibrates, to identify that the voice call request is obtained.

According to an embodiment of the disclosure, the electronic device 1000 may perform the function of the electronic device 1000 that is related to the voice call, based on a user input for accepting the voice call request. Based on a user input for sharing call content with one or more other VDs in the VR, the user input being obtained while the electronic device 1000 performs the function of the electronic device 1000 that is related to the voice call, the electronic device 1000 may transmit information about the call content to the one or more other VDs identified in the VR. According to an embodiment of the disclosure, the one or more other VDs in the VR, identified by the electronic device 1000, may be displayed via an icon 412, which may have a shape, such as, a shape of a human figure.

For example, the electronic device 1000 may identify a user input for selecting the loud speaker icon 404 displayed on the screen of the VD 1002, while the electronic device 1000 performs the function of the electronic device 1000 that is related to the voice call. Also, based on the identified user input, the electronic device 1000 may transmit the information about the call content to the one or more other VDs identified in the VR.

That is, the electronic device 1000 may identify the user input for selecting the loud speaker icon 404, and based on the identified user input, may transmit the information about the call content to the one or more other VDs identified in the VR in which the electronic device 1000 operates, to enable only users of the one or more other VDs identified in the VR to listen to the call content.

Also, while the electronic device 1000 performs the function of the electronic device 1000 that is related to the voice call, the electronic device 1000 may identify a user input for selecting the MUTE icon 406 displayed on the screen of the VD 1002, and based on the identified user input for selecting the MUTE icon 406, may prohibit (stop) the call content from being output from the electronic device 1000.

Figure 5:
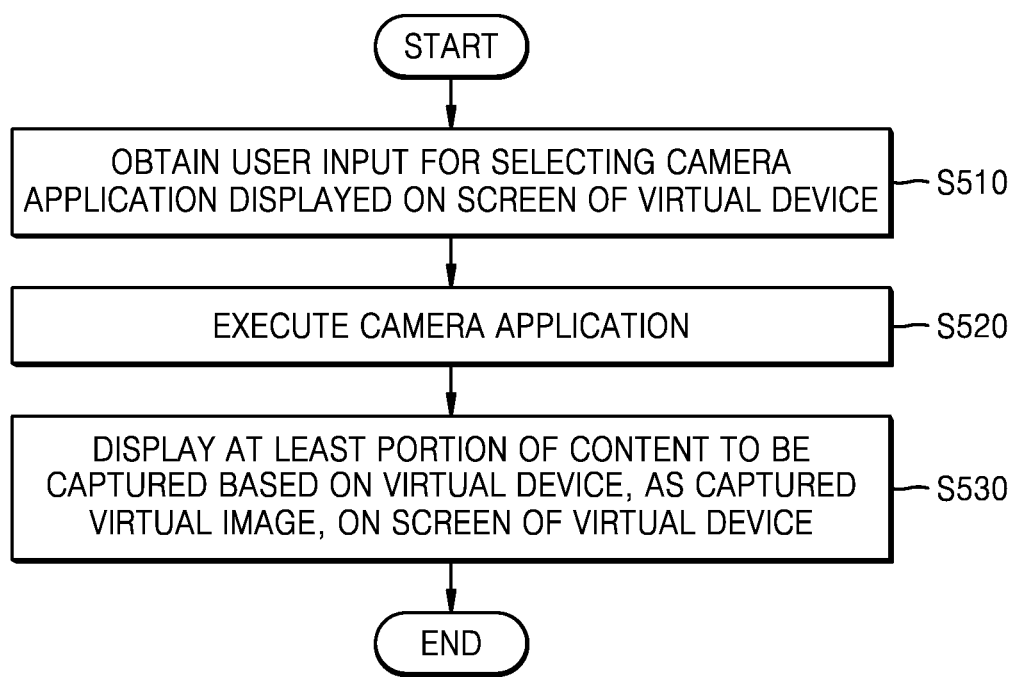
FIG. 5 shows a flowchart of a method, performed by an electronic device, of capturing at least a portion of content displayed on the electronic device, as a captured virtual image, according to an embodiment of the disclosure.

FIG. 5 shows a flowchart of a method, which may be performed by the electronic device 1000, of capturing at least a portion of content displayed on the electronic device, as a captured image (e.g., a captured virtual image), according to an embodiment of the disclosure.

In operation S510, the electronic device 1000 may obtain a user input for selecting a camera application displayed on a screen of the VD 1002. In operation S520, the electronic device 1000 may execute the camera application, based on the user input for selecting the camera application. For example, the electronic device 1000 may identify a user motion for selecting the camera application displayed on the screen of the VD 1002, by using at least one sensor, and may execute the camera application based on the identified user motion.

According to an embodiment of the disclosure, based on the user input for selecting the camera application on the screen of the VD 1002 is obtained, the electronic device 1000 may execute the camera application and may display content related to the executed camera application on the screen of the VD 1002.

Figure 6:
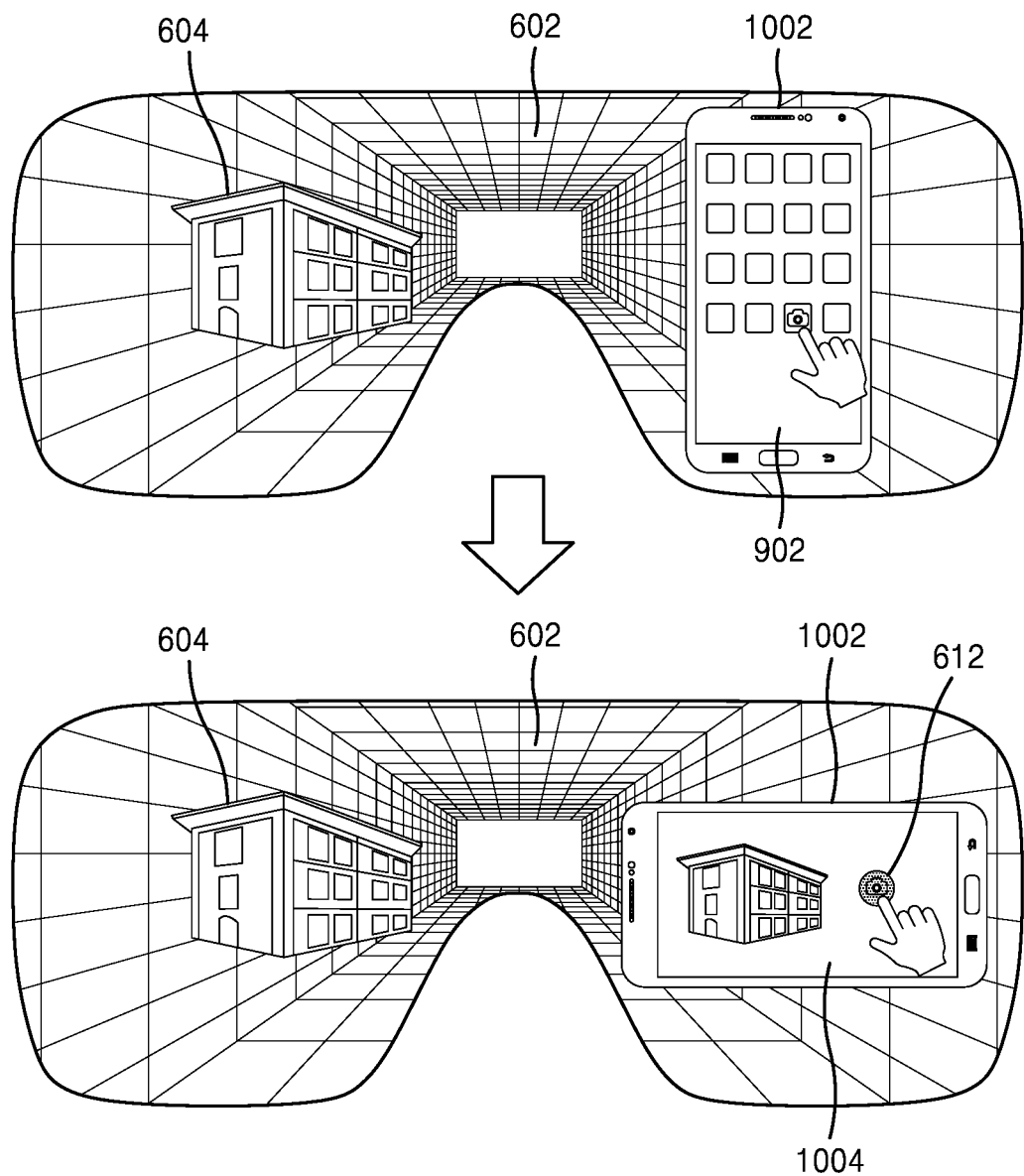
FIG. 6 shows a view for describing a method, performed by an electronic device, of capturing at least a portion of content displayed on the electronic device, as a captured virtual image, according to an embodiment of the disclosure.

In operation S530, the electronic device 1000 may display at least a portion of the content for the VR, which may be captured based on the VD 1002, on the screen of the VD 1002, as the captured virtual image. For example, the electronic device 1000 may execute the camera application and may display the screen related to the VR captured by the VD 1002 in real time on the screen of the VD 1002. Referring to FIG. 6, the method, which may be performed by the electronic device 1000, of capturing the at least a portion of the content for the VR as the captured virtual image will be described in detail.

FIG. 6 is a view for describing the method, performed by the electronic device 1000, of capturing the at least a portion of the content displayed on the electronic device, as the captured virtual image, according to an embodiment of the disclosure.

The electronic device 1000 may display the content for the VR on a display thereof and may also display the VD 1002 associated with the electronic device 1000 in such a way that the VD 1002 overlaps the content for the VR. For example, the electronic device 1000 may display content related to a VR space 602 as the content for the VR, and the VR space 602 displayed by the electronic device 1000 may include at least one virtual object 604 included in the VR space 602.

According to an embodiment of the disclosure, the electronic device 1000 may float virtual objects in a three-dimensional (3D) space by using a computer graphics application programming interface (API) configured to render 3D computer graphics, such as Open Graphics Library (OpenGL), OpenGL for embedded systems (OpenGL ES), or other graphics-based library. Also, the virtual objects may be modeled by using formats, such as the open asset import library format, the 3Ds max format (e.g., Autodesk's 3Ds max format), or one of other three-dimensional (3D) formats.

According to an embodiment of the disclosure, the content for the VR displayed by the electronic device 1000 may include the content related to the VR space 602 and content related to a virtual object 604. The electronic device 1000 may display the virtual object 604 and the VD 1002 on at least a portion of the content related to the VR space 602 in such a way that the virtual object 604 and the VD 1002 overlap the at least a portion of the content related to the VR space 602.

According to an embodiment of the disclosure, a screen corresponding to a screen (for example, a standby screen of a smartphone) displayed on the screen of the electronic device 1000 when the electronic device 1000 is not coupled to the external device 2000, may be displayed on the screen of the VD 1002. The electronic device 1000 may obtain a user input for selecting an icon related to the camera application, from among a plurality of icons included in the screen of the VD 1002, may execute the camera application based on the obtained user input, and may display an image related to at least one of the VR space 602 or the virtual object 604, which may be captured by the VD 1002 according to the execution of the camera application, on a screen 1004 of the VD 1002.

According to an embodiment of the disclosure, the electronic device 1000 may obtain a user input for rotating or leaning the VD 1002, in the state in which the camera application is executed, and may change the content related to the VR space 602 displayed on the screen 1004 of the VD 1002, based on the obtained user input for rotating or leaning the VD 1002.

According to an embodiment of the disclosure, the electronic device 1000 may further display a user interface 612 for capturing the at least one of the VR space 602 or the virtual object 604, on the screen 1004 of the VD 1002. Based on a user input for selecting the user interface 612, the electronic device 1000 may display the image related to the VR space 602 or the virtual object 604 at a present time, which may be captured by the VD 1002, on the screen 1004 of the VD 1002 as the captured virtual image and may store the displayed captured virtual image on a memory of the electronic device 1000.

Figure 7:
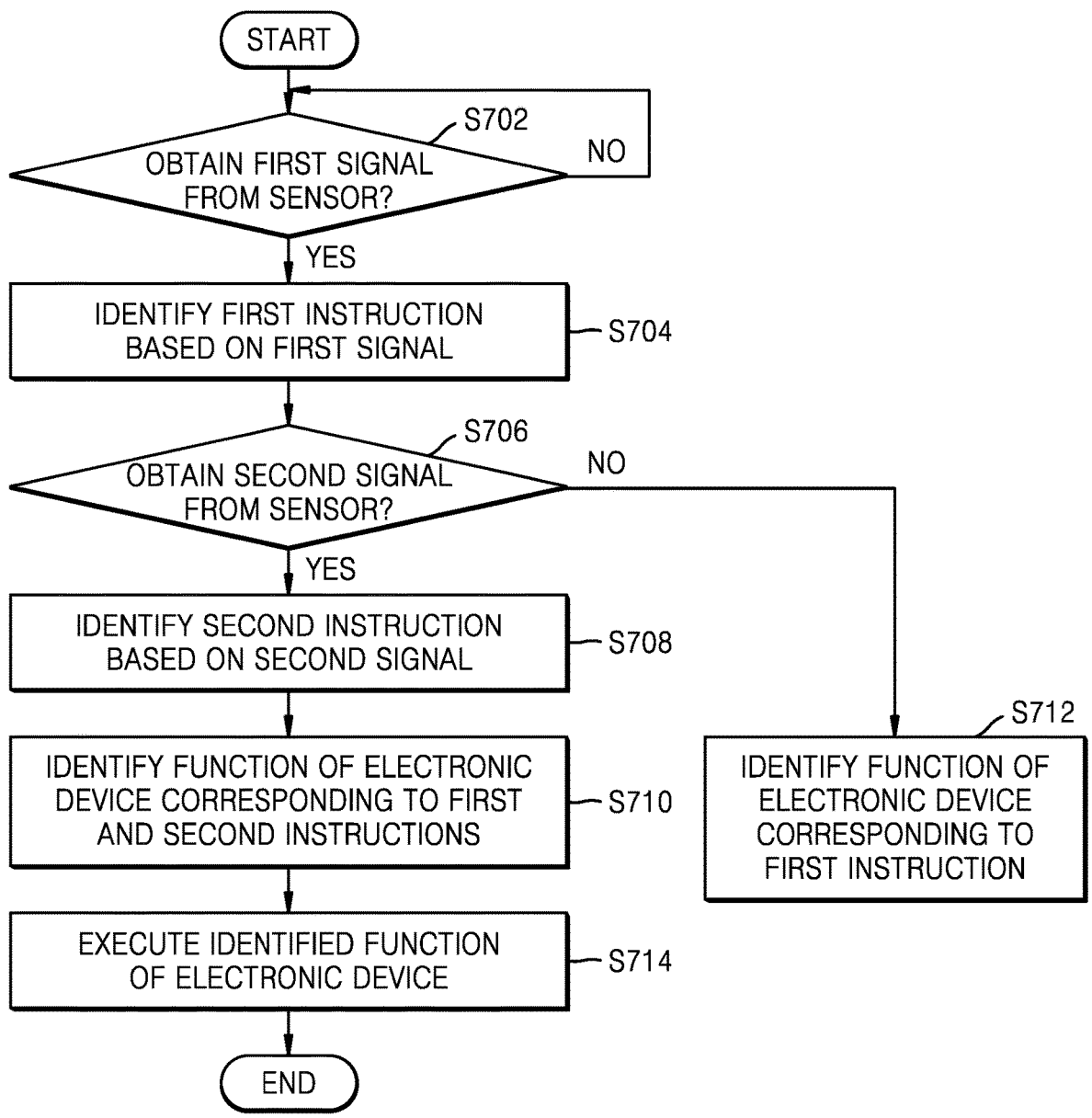
FIG. 7 shows a flowchart of a method performed, by an electronic device, of performing a certain function, according to an embodiment of the disclosure.

FIG. 7 shows a flowchart of a method performed, by the electronic device 1000, of performing a certain function, according to an embodiment of the disclosure.

Referring to FIG. 7, a process, which may be performed by the electronic device 1000, of performing at least one function of the electronic device 1000, by using a detection value obtained from at least one sensor, will be described. In operation S702, the electronic device 1000 may identify whether or not a first signal is obtained from the at least one sensor. Based on the electronic device 1000 identifying that the first signal is not obtained from the at least one sensor, the electronic device 1000 may stand by to attempt to identify again whether the first signal is obtained or not.

For example, the electronic device 1000 may include the at least one sensor, and may obtain the first signal from the at least one sensor. According to an embodiment of the disclosure, the electronic device 1000 may obtain the first signal obtained from at least one sensor included in the external device 2000. In operation S704, based on the electronic device 1000 identifying that the first signal is obtained, the electronic device 1000 may identify a first instruction based on the obtained first signal.

In operation S706, the electronic device 1000 may identify whether or not a second signal is obtained from the at least one sensor. For example, the electronic device 1000 may identify whether the second signal which is different from the first signal is obtained or not, after obtaining the first signal. The electronic device 1000 may obtain the second signal from the at least one sensor included in the electronic device 1000. However, the electronic device 1000 may also receive the second signal obtained from at least one sensor included in the external device 2000.

In operation S708, the electronic device 1000 may identify a second instruction based on the obtained second signal. In operation S710, the electronic device 1000 may identify a function of the electronic device corresponding to the identified first and second instructions. In operation S712, based on the electronic device 1000 identifying that the second signal is not obtained, the electronic device 1000 may identify the function of the electronic device corresponding to the first instruction. In operation S714, the electronic device 1000 may perform the identified function of the electronic device 1000.

Figure 8:
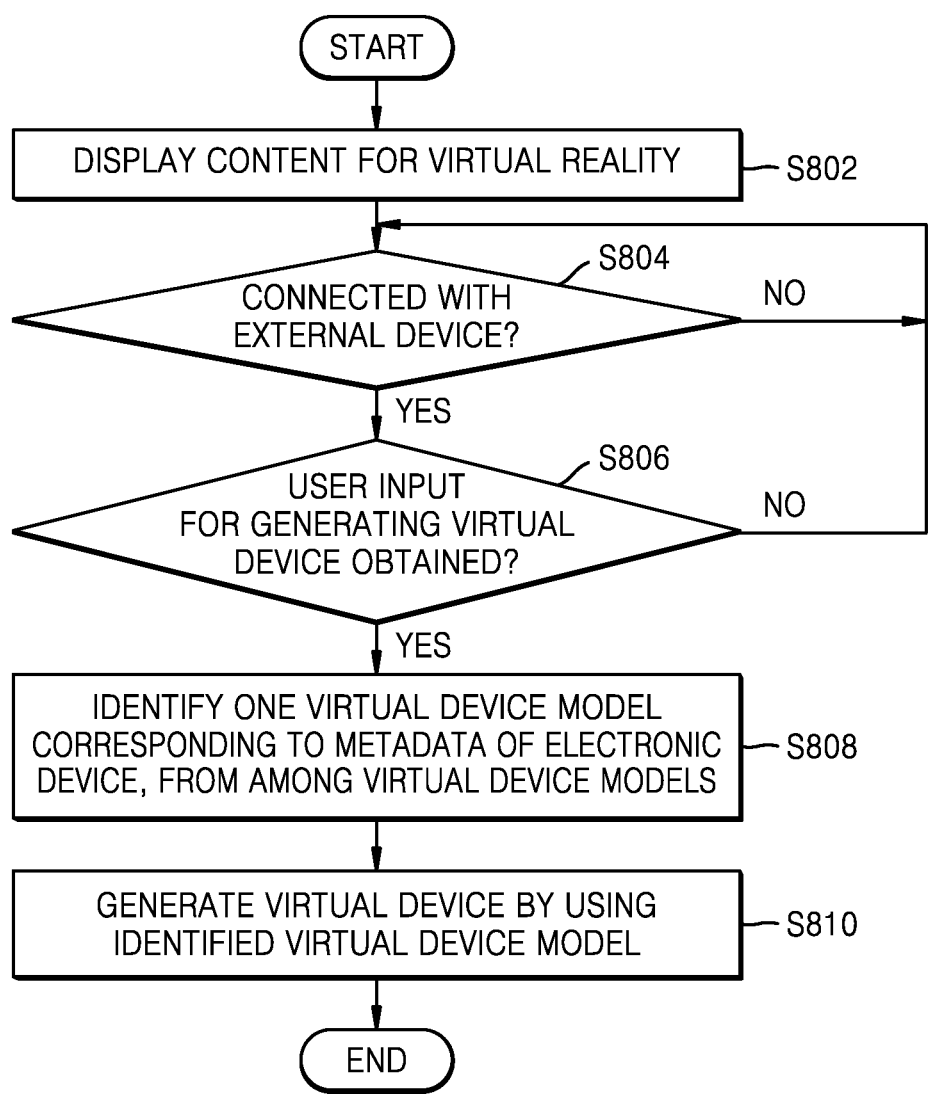
FIG. 8 shows a flowchart of a method performed, by an electronic device, of generating a virtual device, according to an embodiment of the disclosure.

FIG. 8 shows a flowchart of a method, which may be performed by the electronic device 1000, of generating the VD 1002, according to an embodiment of the disclosure.

In operation S802, the electronic device 1000 may display content for VR. In operation S804, the electronic device 1000 may identify whether or not the electronic device 1000 is connected to the external device 2000. According to an embodiment of the disclosure, the electronic device 1000 may be connected to the external device 2000 via a connection portion of the external device 2000. The electronic device 1000 may identify whether the electronic device 1000 is connected to the external device 2000, based on whether the content for the VR is transmitted to and obtained from the external device 2000 via the connection port of the external device 2000. Based on the electronic device 1000 identifying that the electronic device 1000 is not connected to the external device 2000, the electronic device 1000 may continually display the content for the VR or may enter into a standby mode for displaying the content for the VR.

In operation S806, based on the electronic device 1000 identifying that the electronic device 1000 is connected to the external device 2000, the electronic device 1000 may identify whether or not a user input for generating the VD 1002 is obtained. According to an embodiment of the disclosure, the electronic device 1000 may obtain a user input obtained via a user input interface included in the external device 2000. However, it is not limited thereto. For example, the electronic device 1000 may obtain the user input for generating the VD 1002, via a pre-set user interface displayed on the content for the VR.

According to an embodiment of the disclosure, based on the electronic device 1000 identifying that the user input for generating the VD 1002 is not obtained, the electronic device 1000 may continually display the content for the VR or may enter into the standby mode for displaying the content for the VR, without generating the VD 1002.

The VD 1002 according to an embodiment of the disclosure may be a VD to eliminate the user inconvenience of not being able to manipulate the electronic device 1000 while the user is immersed in a virtual environment by using the electronic device 1000. Thus, when the electronic device 1000 is not coupled to the external device 2000 and may be separately manipulated by the user, the VD 1002 may not be required. Thus, in order to prevent the generation of the VD 1002 according to false manipulation of the user, the electronic device 1000 may generate the VD 1002 according to an identified VD model, based on the electronic device 1000 being connected to the external device 2000 and the user input for generating the VD 1002 being obtained.

In operation S808, based on the user input for generating the VD 1002 being obtained, the electronic device 1000 may identify one VD model corresponding to metadata of the electronic device 1000, from among one or more VD models. According to an embodiment of the disclosure, based on the user input for generating the VD 1002, the electronic device 1000 may identify one VD model corresponding to the metadata of the electronic device 1000, from among the one or more VD models. In operation S810, the electronic device 1000 may generate the VD 1002 by using the identified VD model.

Figure 9:
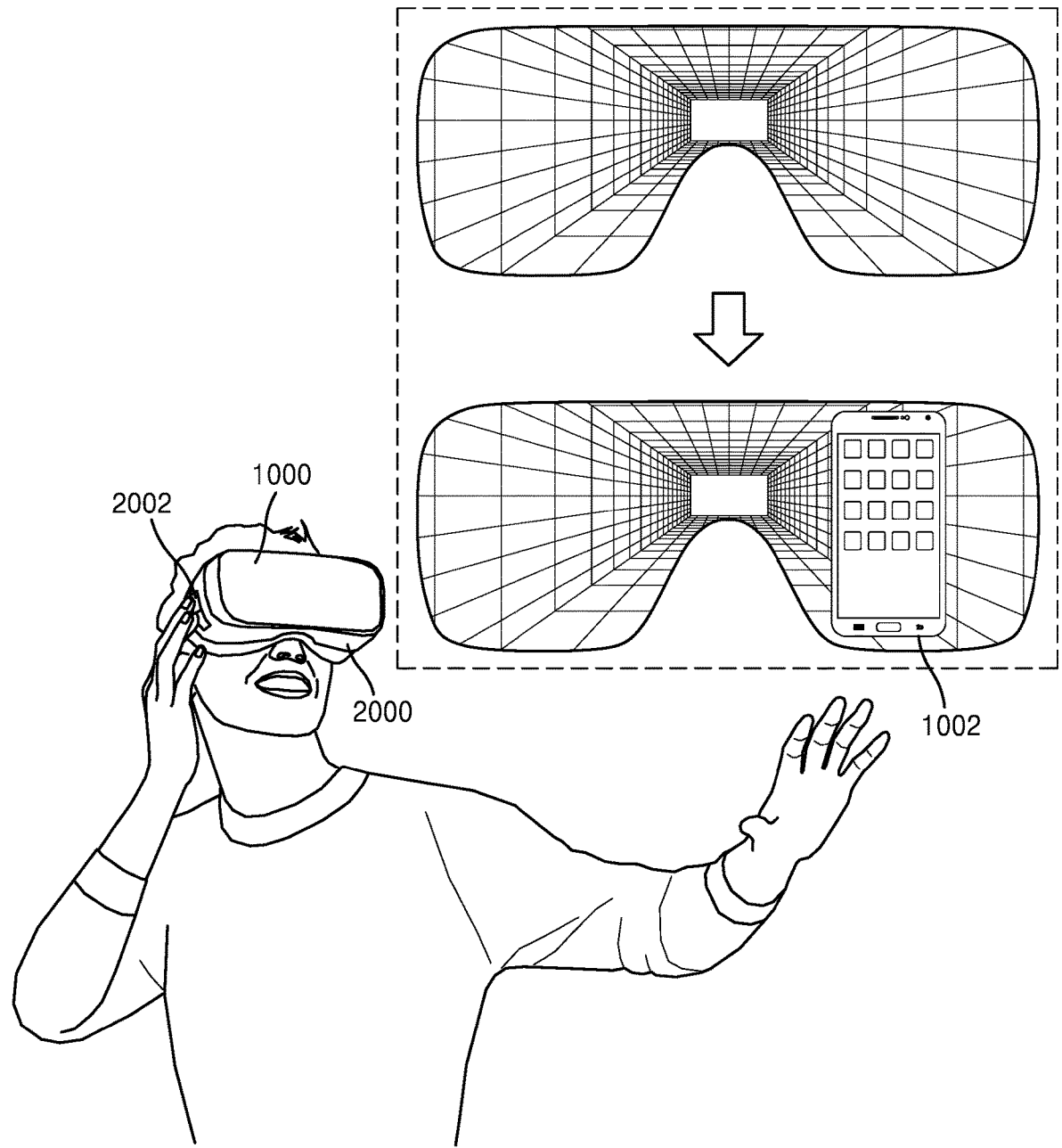
FIG. 9 shows a view for describing a process, performed by an electronic device, of generating a virtual device, according to an embodiment of the disclosure.

FIG. 9 shows a view for describing a process, which may be performed by the electronic device 1000, of generating the VD 1002, according to an embodiment of the disclosure.

The electronic device 1000 may identify whether or not the electronic device 1000 is connected to the external device 2000. According to an embodiment of the disclosure, based on the electronic device 1000 being connected to the external device 2000, the electronic device 1000 may identify whether or not a user input for generating the VD 1002 is obtained.

The external device 2000 connected to the electronic device 1000 may include a user input interface. The electronic device 1000 may obtain the user input for generating the VD 1002 via the user input interface of the external device 2000. For example, the external device 2000 may transmit, to the electronic device 1000, the user input obtained via a touch panel 2002 configured to obtain a user touch input.

According to an embodiment of the disclosure, based on the electronic device 1000 being connected to the external device 2000, the electronic device 1000 may generate the VD 1002 based on the user input for generating the VD 1002 obtained via the touch panel 2002 of the external device 2000, and may display the generated VD 1002 in such a way that the generated VD 1002 overlaps the content for the VR. However, it is not limited thereto, and the electronic device 1000 according to an embodiment of the disclosure may directly obtain the user input for generating the VD 1002 in a state in which the electronic device 1000 is not connected to the external device 2000, and may generate the VD 1002 based on the obtained user input.

Figure 10:
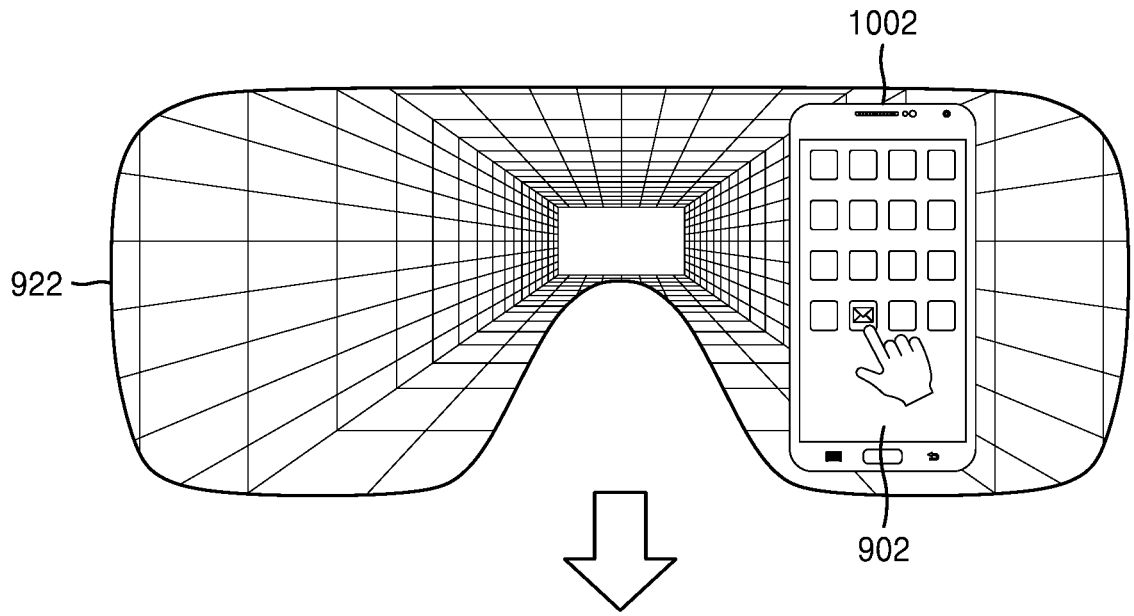
FIG. 10 shows a view for describing a method performed, by an electronic device, of performing, via a virtual device, a function of the electronic device, which is related to text transmission, according to an embodiment of the disclosure.
Figure 10:
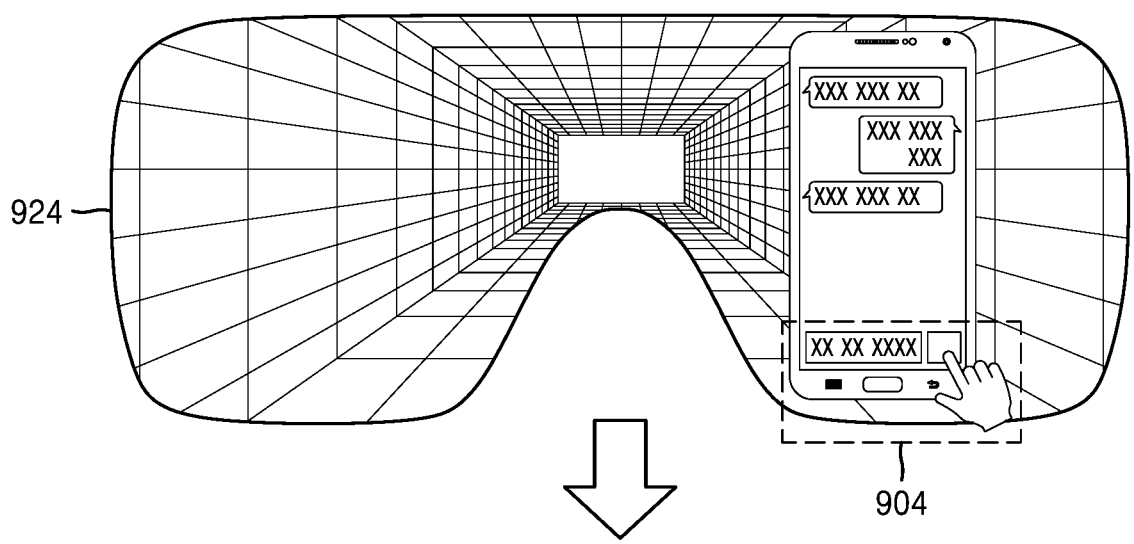
Figure 10:
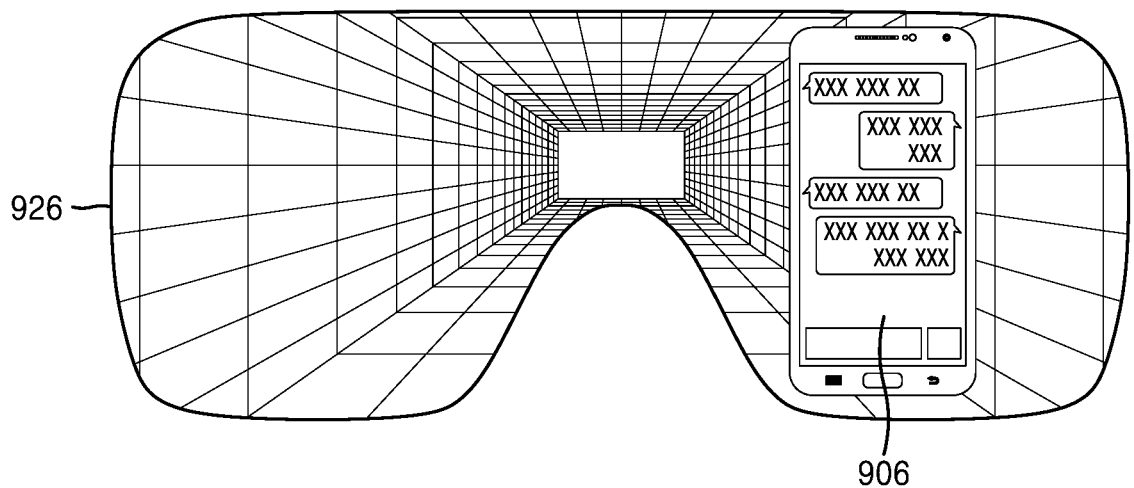

FIG. 10 shows a view for describing a method, which may be performed by the electronic device 1000, of performing, via the VD 1002, a function of the electronic device that is related to text transmission, according to an embodiment of the disclosure.

A screen 922 of FIG. 10 shows content related to a VR space and the VD 1002 which may be viewed by a user via at least one lens included in an external device 2000. The electronic device 1000 may obtain a user input for selecting a message application displayed on the screen 902 of the VD 1002. For example, the electronic device 1000 may identify user motion information indicated by a gesture of selecting the message application on the screen 902 of the VD 1002, by using detection values obtained from at least one sensor, and may obtain the user input for selecting the message application displayed on the screen 902 of the VD 1002, based on the identified user motion information.

Referring to a screen 924, based on the user input for selecting the message application displayed on the screen 902 of the VD 1002, the electronic device 1000 may execute the message application pre-stored in the electronic device 1000 and may display a screen related to the message application on the screen 902 of the VD 1002. For example, as the screen related to the message application, the electronic device 1000 may display a screen about a history of previous text transmission and an input window 904 (for example, a GUI for an input of text) for a text input on the screen 902 of the VD 1002. Referring to a screen 926, the electronic device 1000 may display a message obtained from a user via the input window 904, on a screen 906 of the VD 1002, together with a history of previous text transmission and reception by the user.

Thus, based on the user being immersed in the virtual environment, the electronic device 1000 may enable the user to use the function of the electronic device 1000 that is related to the message transmission, without detaching the electronic device 1000 from the external device 2000 or taking off the computing system including the external device 2000 and the electronic device 1000 currently worn by the user.

Figure 11:
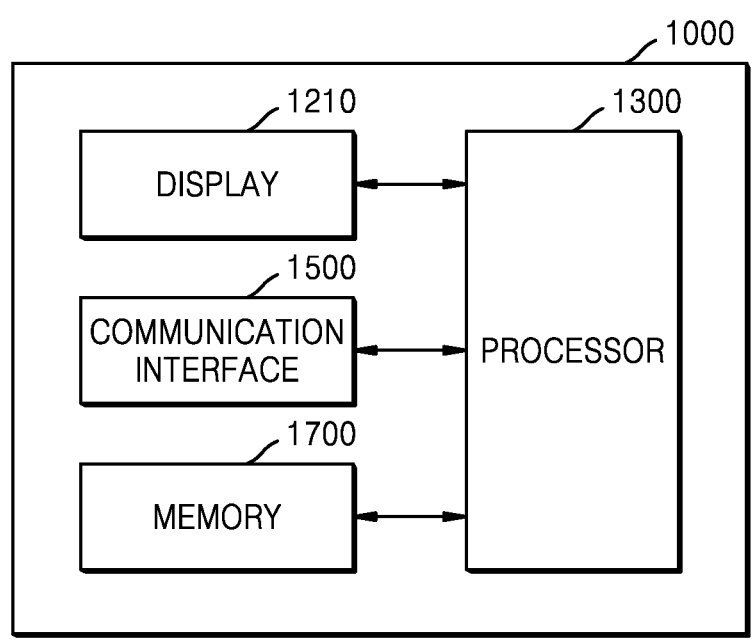
FIG. 11 shows a block diagram of an electronic device according to an embodiment of the disclosure.

FIG. 11 shows a block diagram of the electronic device 1000 according to an embodiment of the disclosure.

Figure 15:
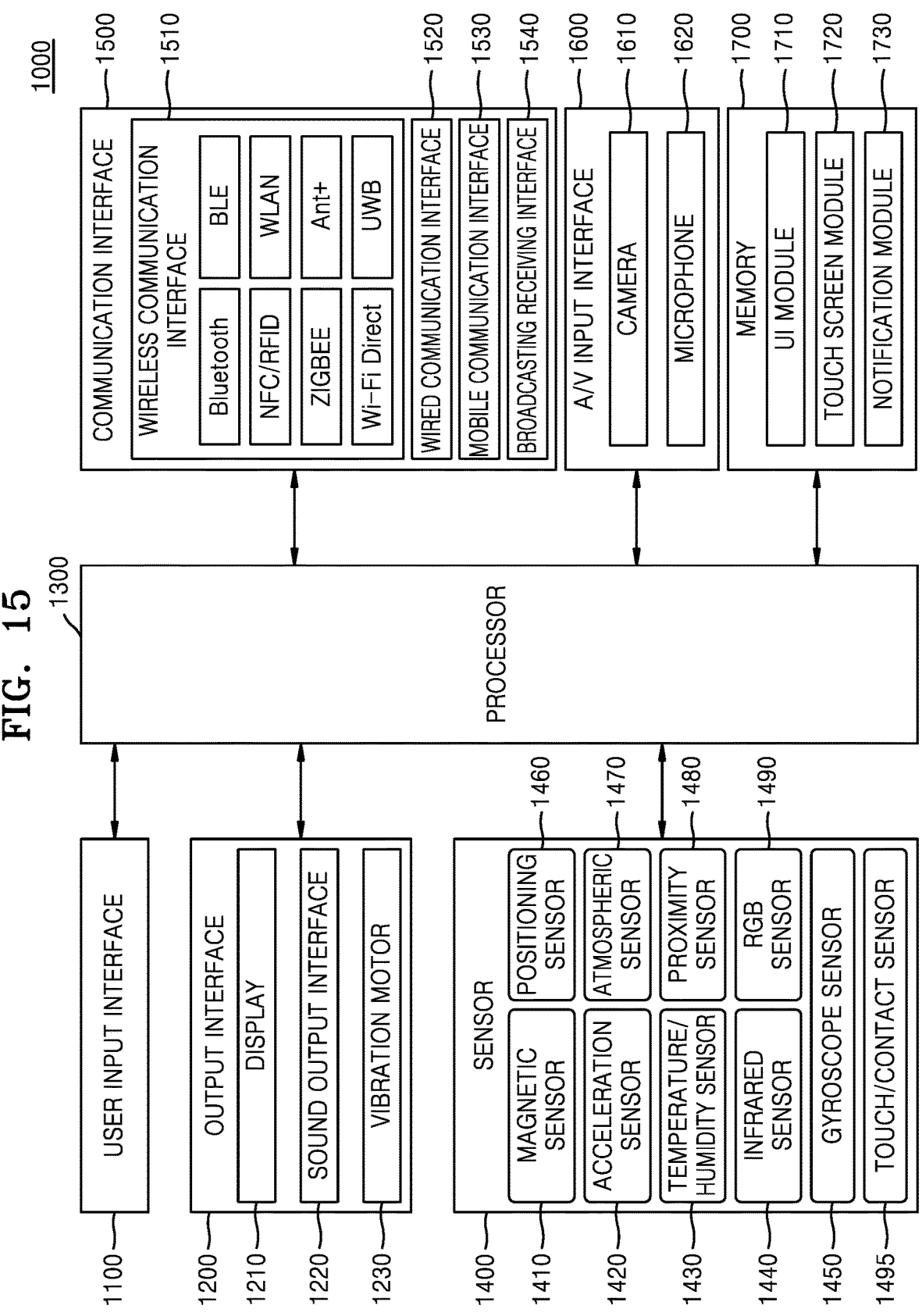
FIG. 15 shows a block diagram of an electronic device according to an embodiment of the disclosure.

As illustrated in FIG. 11, the electronic device 1000 according to an embodiment of the disclosure may include a display 1210, a processor 1300, a communication interface 1500, and a memory 1700. However, not all illustrated components are essential components. The electronic device 1000 may be realized by including more components than the illustrated components or less components than the illustrated components. For example, as illustrated in FIG. 15 to be described below, the electronic device 1000 according to an embodiment of the disclosure may further include a user input interface 1100, an output interface 1200, a sensor 1400, an audio/video (A/V) input interface 1600, and a power supply (not shown).

The user input interface 1100 is for a user to input data for controlling the electronic device 1000. For example, the user interface 1100 may include at least one of: a key pad, a dome switch, a touch pad (e.g., a touch capacitance method, a pressure resistive method, an infrared detection method, a surface ultrasonic conductive method, a integral tension measuring method, a piezo effect method, etc.), a jog wheel, or a jog switch, etc., but it is not limited thereto.

According to an embodiment of the disclosure, the user input interface 1100 may further include an additional interface for capturing a motion of a user or an audio recording device. According to an embodiment of the disclosure, the user input interface 1100 may obtain various user inputs for manipulating the electronic device 1000, the VD 1002, or the external device 2000. The user input interface 1100 may identify one or more of: a direction of a glance of a user, a motion of a head, or a gesture of at least one of a hand or an arm, by using a detection value obtained from the sensor 1400 based on a user motion.

According to an embodiment of the disclosure, the user input interface 1100 may obtain one or more of: a user input for generating the VD 1002, a user input for accepting a voice call request received from another electronic device connected to the electronic device 1000, a user input for sharing call content of a voice call with other VDs in VR, or a user input for capturing at least a portion of content to be captured based on the VD 1002 in the VR as a captured virtual image, etc. According to an embodiment of the disclosure, based on the electronic device 1000 not being connected to the external device 2000, the user input interface 1100 of the electronic device 1000 may obtain at least one of: a user input for generating the VD 1002, a user input for accepting a voice call request received from another electronic device connected to the electronic device 1000, a user input for sharing call content of a voice call with one or more other VDs in VR, or a user input for capturing at least a portion of content to be captured based on the VD 1002 in the VR as a captured virtual image, etc.

The output interface 1200 may output an audio signal, a video signal, or a vibration signal and may include at least one of: the display 1210, a sound output interface 1220, or a vibration motor 1230, etc.

The display 1210 may display content for VR processed by the electronic device 1000. For example, the display 1210 may include a screen for displaying and outputting information about the content for the VR. Also, the screen may display an image. According to an embodiment of the disclosure, the electronic device 1000 may output at least one of the content for the VR or the VD 1002 associated with the electronic device 1000, via the display 1210.

The sound output interface 1220 may output audio data obtained from the communication interface 1500 or stored in the memory 1700. The sound output interface may be a speaker. Also, the sound output interface 1220 may output sound signals related to functions (for example, a call signal reception sound, a message reception sound, a notification sound, etc.) performed by the electronic device 1000.

The processor 1300 may generally control general operations of the electronic device 1000. For example, the processor 1300 may generally control the display 1210, and the communication interface 1500, etc., by executing programs stored in the memory 1700. Also, the processor 1300 may perform the functions of the electronic device 1000 that are described with reference to FIGS. 1 through 10, by executing the programs stored in the memory 1700.

In detail, the processor 1300 may control the display 1210 to display the content for the VR and display the VD 1002 for controlling at least one function of the electronic device 1000 in such a way that the VD 1002 overlaps at least a portion of the content for the VR. Also, the processor 1300 may control the communication interface 1500 to enable at least a portion of the information about the content for the VR to be transmitted and obtained via a connection port of the external device 2000 coupled to the electronic device 1000.

According to an embodiment of the disclosure, the processor 1300 may obtain the user input for generating the VD 1002 and based on the user input for generating the VD 1002, may identify at least one VD model corresponding to metadata of the electronic device 1000, from among pre-stored one or more VD models, to generate the VD 1002 by using the identified at least one VD model.

Also, according to an embodiment of the disclosure, the processor 1300 may include a logic circuit for realizing programming and a processing core, and may include physical components of a digital circuit, which are required to perform functions of the electronic device 1000, such as an application specific integrated circuit (ASIC), a field-programmable gate array (FPGA), or a programmable logic device (PLD). According to an embodiment of the disclosure, the processor 1300 may include a single processor. However, it is not limited thereto and the processor 1300 may include a plurality of processors. For example, the electronic device 1000 according to the disclosure may process the functions of the electronic device 1000, the functions being described with reference to FIGS. 1 through 10, by using a single processor. However, the electronic device 1000 may also process the functions by using a plurality of processors.

Also, the processor 1300 may identify whether or not the electronic device 1000 is connected to the external device 2000 via the connection port of the external device 2000. Based on the electronic device 1000 being connected to the external device 2000, the processor 1300 may generate the VD 1002 based on the user input for generating the VD 1002.

According to an embodiment of the disclosure, the processor 1300 may control the communication interface 1500 to obtain a voice call request from another electronic device connected to the electronic device 1000. Based on the received voice call request, the processor 1300 may display a pre-set telephone call image on a screen of the VD 1002 and at the same time, may output a notification signal about the voice call request to the external device 2000. Also, based on a user input for accepting the voice call request, the processor 1300 may perform a function of the electronic device 1000 that is related to a voice call.

According to an embodiment of the disclosure, the processor 1300 may obtain the user input for sharing the call content of the voice call with other VDs in the VR, identify the other VDs located within a range of a certain distance from the VD 1002 corresponding to the electronic device 1000, and transmit information about the call content to the identified other VDs.

According to an embodiment of the disclosure, the processor 1300 may control the user input interface 1100 to obtain a user input for selecting a camera application displayed on a screen of the VD 1002, may execute the camera application based on the user input for selecting the camera application, and may control the display 1210 to display at least a portion of content to be captured based on the VD 1002, on the screen of the VD 1002, as a captured virtual image.

Also, the processor 1300 may obtain a user input for selecting a message application displayed on the screen of the VD 1002 and may execute the message application pre-stored in the electronic device 1000 based on the user input for selecting the message application. Also, the processor 1300 may control the display 1210 to display, on the screen of the VD 1002, text instructed via a GUI configured to obtain text.

According to an embodiment of the disclosure, the processor 1300 may render the VD 1002 in the VR in the form corresponding to the electronic device 1000, and may display a GUI corresponding to a GUI of the electronic device 1000, on the screen of the VD 1002.

The sensor 1400 may detect a state of or around the electronic device 1000 and transmit detected information to the processor 1300. The sensor 1400 may be used to generate at least one of the specification information of the electronic device 1000, the state information of the electronic device 1000, the ambient environmental information of the electronic device 1000, the user status information, or the use history information of the user.

According to an embodiment of the disclosure, the sensor 1400 may obtain a detection value by detecting a motion of a user of the electronic device 1000 and may identify motion information of the user of the electronic device 1000 by using the obtained detection value. For example, the sensor 1400 may obtain the detection value by detecting a motion of the user for selecting the camera application on the screen of the VD 1002 in the VR, and transmit the obtained detection value to the processor 1300. The processor 1300 may identify, by using the detection value, motion information about a gesture of the user for selecting an icon of the camera application on the screen of the VD 1002 and may identify, based on the identified motion information, a user input for selecting the icon of the camera application on the screen of the VD 1002.

The sensor 1400 may include, but is not limited to, at least one of a magnetic sensor 1410, an acceleration sensor 1420, a temperature and/or humidity sensor 1430, an infrared sensor 1440, a gyroscope sensor 1450, a positioning sensor (for example, a global positioning sensor (GPS)) 1460, an atmospheric sensor 1470, a proximity sensor 1480, a motion sensor (not shown), a touch screen or contact intensity sensor (1495, a tactile output interface, or an illuminance sensor (a red-green-blue (RGB) sensor) 1490. The function of each of the sensors may be intuitively inferred by one of ordinary skill in the art from its name, and thus, its detailed description will be omitted.

The communication interface 1500 may include one or more components to enable the electronic device 1000 to communicate with another electronic device (not shown), the external device 2000, and a server. The other electronic device (not shown) may be a computing device like the electronic device 1000, or a detection device, but is not limited thereto. For example, the communication interface 1500 may include at least one of: a wireless communication interface 1510, a wired communication interface 1520, a mobile communication interface 1530, or a broadcast receiving interface 1540.

The wireless communication interface 1510 may include at least one of: a Bluetooth communication interface, a Bluetooth low energy (BLE) communication interface, a near-field communication interface, a Wireless Local Area Network (WLAN) (Wi-fi) communication interface, a Zigbee communication interface, an infrared data association (IrDA) communication interface, a Wi-fi direct (WFD) communication interface, a ultra wideband (UWB) communication interface, an Ant+ communication interface, etc., but it is not limited thereto.

The wired communication interface 1520 may include at least one of a universal serial bus (USB), a high definition multimedia interface (HDMI), a recommended standard 232 (RS-232), a power line communication, or plain old telephone service (POTS), but it is not limited thereto.

The mobile communication interface 1530 may transmit and obtain wireless signals to and from at least one of a base station, an external terminal, or a server, in a mobile communication network. Here, the wireless signals may include a voice call signal, a video telephony call signal, or various types of data according to exchange of text/multimedia messages.

The broadcast receiving interface 1540 may obtain broadcast signals and/or information related to a broadcast from the outside via broadcasting channels. The broadcasting channels may include at least one of: a satellite channel or a ground wave channel. According to an embodiment of the disclosure, the electronic device 1000 may not include the broadcast receiving interface 1540.

According to an embodiment of the disclosure, the communication interface 1500 may obtain the voice call request from the other electronic device or output the notification signal about the voice call request to the external device 2000, under control of the processor 1300. Also, under control of the processor 1300, the communication interface 1500 may transmit the text that is input by the user of the electronic device 1000 on the screen of the VD 1002 corresponding to the electronic device 1000, to the other electronic device connected to the electronic device 1000.

Also, according to an embodiment of the disclosure, under control of the processor 1300, the communication interface 1500 may request transmission of the content for the VR, transmit the metadata of the electronic device 1000 to a server, and obtain pre-identified one or more VD models and the content for the VR from the server.

The audio/visual (A/V) input interface 1600 may be included for an input of at least one of: an audio signal or a video signal and may include a camera 1610, a microphone 1620, etc. The camera 1610 may obtain an image frame, such as a still image or a video, via an image sensor, in a video telephony mode or a capturing mode. The image captured by the image sensor may be processed by the processor 1300 or an additional image processing interface (not shown).

The microphone 1620 may obtain an external sound signal and process the external sound signal into electrical sound data. For example, the microphone 1620 may obtain a sound signal from the external device 2000 or a user. The microphone 1620 may obtain a voice input of a user. The microphone 1620 may use various noise removal algorithms to remove noise occurring in the process of obtaining the external sound signal.

The memory 1700 may store instructions for processing and controlling of the processor 1300 and may store data input to the electronic device 1000 or output from the electronic device 1000. According to an embodiment of the disclosure, the memory 1700 may include sets of instructions required for various models, applications, programs, package services, VD models, etc. of the electronic device 1000. Also, the instructions for the application programs stored in the memory 1700 may include instructions for mobile application programs, and application programs executable by one or more client devices.

Also, the memory 1700 may store an image and a result of searching for the image stored in the memory 1700. The memory 1700 may store information about images stored in the electronic device 1000.

The memory 1700 may include a memory of a flash memory type, a hard disk type, a multimedia card micro type, or a card type (for example, an SD or XD memory) and at least one type of storage medium from among random-access memory (RAM), static RAM (SRAM), read-only memory (ROM), electrically erasable programmable ROM (EEPROM), programmable ROM (PROM), magnetic memory, magnetic disks, or optical disks.

Figure 12:
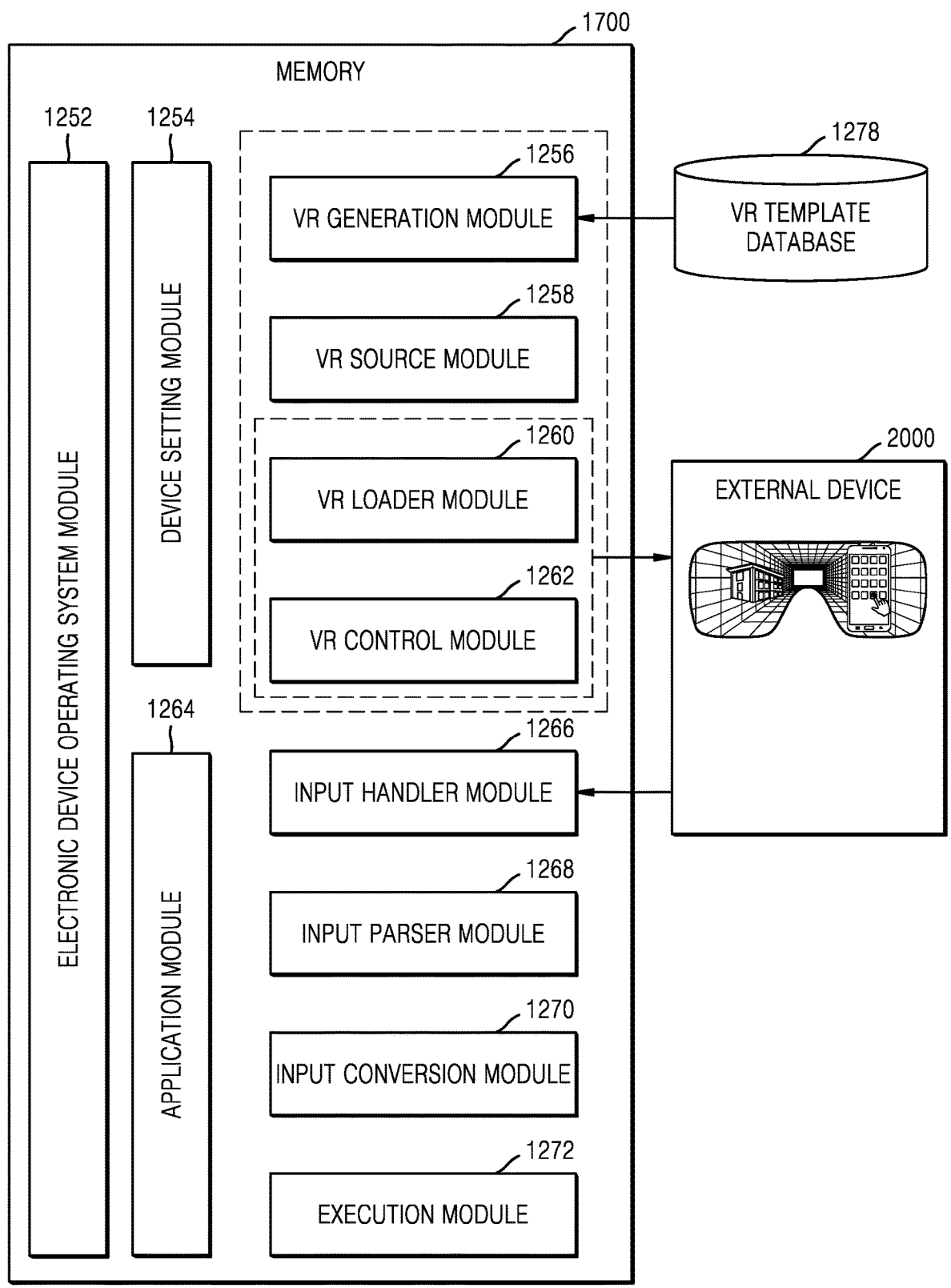
FIG. 12 shows a block diagram for describing a plurality of modules in a memory of an electronic device, according to an embodiment of the disclosure.

The programs stored in the memory 1700 may be divided into a plurality of modules according to their functions. For example, the programs may be divided into a UI module 1710, a touch screen module 1720, and a notification module 1730. However, it is not limited thereto, and as illustrated in FIG. 12, the programs may further include other modules. For example, as illustrated in FIG. 12 to be described below, in addition to a user interface (UI) module 1710, a touch screen module 1720, and a notification module 1730, the memory 1700 according to an embodiment of the disclosure may further include one or more of: an electronic device operating system module 1252, an application module 1264, a setting module 1254, a VR generation module 1256, a VR source module 1258, a VR loader module 1260, a VR control module 1262, an input handler module 1266, an input parser module 1268, an input conversion module 1270, or an execution module 1272.

The UI module 1710 may provide a specialized UI, a GUI, etc. associated with the electronic device 1000 for each application. The touch screen module 1720 may detect a touch gesture of a user on the touch screen (e.g., via the touch screen or contact intensity sensor 1495) and transmit information about the touch gesture to the processor 1300. The touch screen interface 1720 according to one or more embodiments of the disclosure may recognize and analyze a touch code. The touch screen module 1720 may be formed as additional hardware including a controller.

The notification module 1730 may generate a signal for notifying the occurrence of an event of the electronic device 1000. Examples of the event occurring in the electronic device 1000 may include at least one of: reception of a call signal, reception of a message, an input of a key signal, notification of a schedule, etc. The notification module 1730 may output the notification signal as a video signal through the display 1210, may output the notification signal as an audio signal through the sound output interface 1220 (e.g., through a speaker), or may output the notification signal as a vibration signal through the vibration motor 1230.

FIG. 12 is a block diagram for describing the plurality of modules in the memory 1700 of the electronic device 1000, according to an embodiment of the disclosure.

The memory 1700 according to an embodiment of the disclosure may include the electronic device operating system module 1252, the application module 1264, the setting module 1254, the VR generation module 1256, the VR source module 1258, the VR loader module 1260, the VR control module 1262, the input handler module 1266, the input parser module 1268, the input conversion module 1270, and the execution module 1272.

The electronic device operating system module 1252 may include a plurality of instructions for an operation of an operating system (OS) required for controlling the electronic device 1000. According to an embodiment of the disclosure, the instructions included in the electronic device operating system module 1252 may be defined by an operating environment of the electronic device 1000 and may be processed by one or more central processing units (CPUs). According to an embodiment of the disclosure, when the electronic device 1000 includes a plurality of processors, the plurality of processors may communicate with one another via the bus in the electronic device 1000.

The application module 1264 may include a plurality of instructions about applications mounted on the electronic device 1000 and enabling the use of various functions of the electronic device 1000. For example, the application module 1264 may include an AR application module, an MR application module, or a VR application module. Also, the application module 1264 may include at least one of a telephone call module, a text transmission module, a camera application module, a contact module, a video conference module, an electronic mail module, an instant messaging module, a work out support module, an image management module, a video player module, a music player module, a note module, a map module, a browser module, a communication module, a graphics module, a GPS module, a calendar module, a weather update module, a stock presentation module, a calculator module, a watch module, a dictionary module, a search module, or a user created module.

The application module 1264 may be obtained from a server or another electronic device and may be stored in the memory 1700 of the electronic device 1000.

The device setting module 1254 may include instructions related to setting of device values required to use at least one function of the electronic device 1000. The VR generation module 1256 may generate a VRD by using at least one of the device values set by using the device setting module 1254 or a VR template database 1278. According to an embodiment of the disclosure, the VRD may include a VD visually rendered and emulated in the content for the VR.

For example, the VR generation module 1256 may include instructions for generating the VRD by using at least one VD model received from the VR source module 1258 including a plurality of VR models which may be distinguished from one another based on at least one of a device identifier of the electronic device 1000 or metadata of the electronic device 1000. The VR loader module 1260 may include instructions required to load the content for the VR and the VD 1002 associated with the electronic device 1000, into a display of the external device 2000. The VR control module 1262 may include instructions for controlling an operation of the generated VD.

The input handler module 1266 may obtain input instructions identified by using detection values obtained from at least one sensor of the electronic device 1000 or the external device 2000, and transmit the obtained input instructions to the input parser module 1268. The input parser module 1268 may include input instructions for separating the obtained input instructions into units related to the at least one function of the electronic device 1000. The processor 1300 of the electronic device 1000 may execute the user input instruction based on the user motion, for each unit related to the at least one function of the electronic device 1000, by using the input instructions of the input parser module 1268.

Also, the input conversion module 1270 may include instructions for converting (for example, parsing) the input instructions separated into the units related to the at least one function of the electronic device 1000, into a format for executing the at least one function of the electronic device 1000. The execution module 1272 may include instructions for executing the input instructions for executing the parsed at least one function of the electronic device 1000. That is, the processor 1300 of the electronic device 1000 may execute the actual functions of the electronic device 1000 by using the instructions of the execution module 1272.

That is, the electronic device 1000 may sequentially process the input instructions identified based on the detection values obtained from the at least one sensor of the electronic device 1000 or the external device 2000 by using the instructions stored in at least one of the input handler module 1266, the input parser module 1268, the input conversion module 1270, or the execution module 1272.

Figure 13:
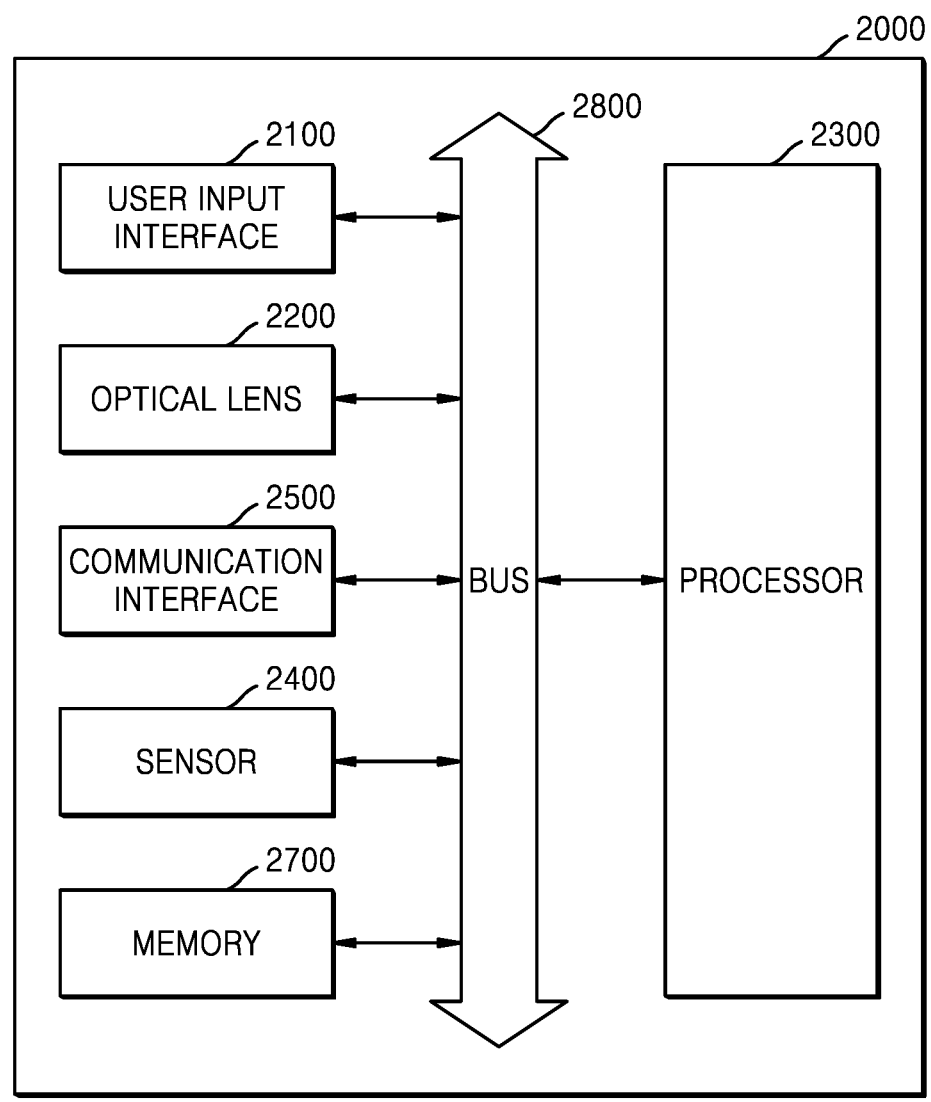
FIG. 13 shows a block diagram of an external device according to an embodiment of the disclosure.

FIG. 13 is a block diagram of the external device 2000 according to an embodiment of the disclosure.

According to an embodiment of the disclosure, the external device 2000 may include a user input interface 2100, an optical lens 2200, a processor 2300, a sensor 2400, a communication interface 2500, a memory 2700, and a bus 2800. However, not all illustrated components are essential components. The external device 2000 may be realized by including more components than the illustrated components or less components than the illustrated components. For example, in addition to the user input interface 2100, the optical lens 2200, the processor 2300, the sensor 2400, the communication interface 2500, the memory 2700, and the bus 2800, the external device 2000 may further include a power supply, and an output interface.

The user input interface 2100 may obtain a user input from a user, under control of the processor 2300. For example, the user input interface 2100 may include at least one of: a key pad, a dome switch, a touch pad (e.g., a touch capacitance method, a pressure resistive method, an infrared detection method, a surface ultrasonic conductive method, a integral tension measuring method, a piezo effect method, etc.), a jog wheel, or a jog switch, etc., but it is not limited thereto. According to an embodiment of the disclosure, the user input interface 2100 may correspond to the user input interface 1100 of the electronic device 1000 described above.

According to an embodiment of the disclosure, the user input interface 2100 may obtain at least one of: a user input for generating the VD 1002, a user input for accepting a voice call request obtained from another electronic device connected to the electronic device 1000, a user input for sharing call content of a voice call with other VDs in VR, a user input for capturing at least a portion of content to be captured based on the VD 1002 in the VR as a captured virtual image, or one of other user inputs for interacting with the VD 1002.

The optical lens 2200 may include at least one lens, which may be located at the front surface of one eye or both eyes of the user wearing the external device 200. The optical lens 2200 may provide to the user, via the at least one lens located at the front surface of the one eye or both eyes of the user, content for VR or content related to the VD 1002 associated with the electronic device 1000, the content being displayed through a display of the electronic device 1000. According to an embodiment of the disclosure, the optical lens 2200 may include at least one of lenses manufactured by HTV Vive, Oculus Rift, PlayStation VR, Google Cardboard, HoleLens, Gear VR, DayDream View, and Sulon Q.

According to an embodiment of the disclosure, the processor 2300 may control general operations of the external device 2000. For example, the processor 2300 may generally control the output interface, the communication interface 2500, etc., by executing programs stored in the memory 2700. Also, the processor 2300 may perform the functions of the external device 2000 that are described with reference to FIGS. 1 through 10, by executing the programs stored in the memory 2700.

For example, the processor 2300 of the external device 2000 may identify whether or not the electronic device 1000 is electrically connected to the external device 2000 via a connection portion of the external device 2000. Also, the processor 2300 may transmit a user input obtained via the user input interface 2100 of the external device 2000, to the electronic device 1000, via the communication interface 2500.

According to an embodiment of the disclosure, the processor 2300 may obtain information about at least a portion of the content for the VR from the electronic device 1000, via the communication interface 2500.

The sensor 2400 may detect the state of or around the external device 2000 and transmit detected information to the processor 2300. The sensor 2400 may dynamically detect current locations and directions of the external device 2000 and the electronic device 1000 in a VR space, based on a user of the computing system 3000 including the electronic device 1000 and the external device 2000 moving his/her head in one or many directions to look around the virtual environment.

According to an embodiment of the disclosure, the sensor 2400 may transmit the detected information not only to the processor 2300 of the external device 2000, but also to the electronic device 1000. According to an embodiment of the disclosure, the sensor 2400 of the external device 2000 may include at least one of an optical sensor, a positioning sensor, a motion sensor, a contact intensity sensor, or a tactile output generation interface. Also, according to an embodiment of the disclosure, the sensor 2400 may correspond to the sensor 1400 of the electronic device 1000. The function of each of the sensors may be intuitively inferred by one of ordinary skill in the art from its name, and thus, its detailed description will be omitted.

The communication interface 2500 may transmit and obtain information about the content for the VR to and from another electronic device or a server, under control of the processor 2300. According to an embodiment of the disclosure, the communication interface 2500 may further obtain the information about the at least a portion of the content for the VR, the user input for generating the VD 1002, etc., from the electronic device 1000, under control of the processor 2300.

The memory 2700 may store programs for processing and controlling of the processor 2300 and may store data input to the external device 2000 or output from the external device 2000. Modules for controlling operations of the external device 2000, the modules being stored in the memory 2700, will be described in detail with reference to FIG. 15 to be described below.

The bus 2800 may function as a data transmission and reception channel among the components of the external device 2000. For example, the processor 2300 of the external device 2000 may obtain, via the bus 2800, at least one of the user input obtained via the user input interface 2100, the information about the content for the VR obtained via the optical lens 2200, the user input for generating the VD 1002 obtained via the communication interface 2500, various detection values obtained from the sensor 2400, or instructions stored in the memory 2700 for controlling the operations of the external device 2000.

The power supply (not shown) may supply power to at least one of the user input interface 2100, the optical lens 2200, the communication interface 2500, the sensor 2400, the memory 2700, or the processor 2300, for the operations of the external device 2000.

The output interface (not shown) may output the content for the VR provided from the electronic device 1000. According to an embodiment of the disclosure, the external device 2000 may provide the content for the VR provided from the electronic device 1000, to the user, via the at least one lens of the external device 2000, the at least one lens facing a display screen of the electronic device 1000. However, the external device 2000 may obtain the information about the content for the VR from the electronic device 1000 via the connection port and display the obtained information about the content for the VR through a display included in the external device 2000 to provide the content for the VR to the user. According to an embodiment of the disclosure, the display included in the external device 2000 may include at least one of a liquid crystal display (LCD) or a cathode ray tube (CRT). According to an embodiment of the disclosure, the output interface may further include a speaker for audibly outputting information about audio data in the information about the content.

A fastening portion (not shown) may include at least one of: a first fastening portion or a second fastening portion. For example, the electronic device 1000 may be mounted on the external device 2000 by using the first fastening portion. Also, the entire external device 2000 including the display may be fixed to the head portion of the user via the second fastening portion. According to an embodiment of the disclosure, the second fastening portion may be a mounting member and may be formed in the form of a band surrounding the head portion of the user. According to an embodiment of the disclosure, the second fastening portion may include a band portion and a length adjusting portion, and the length adjusting portion may adjust the length of the band portion according to a respective size of the head of the user. The band portion may be formed to have various shapes, such as a strap, eyeglass temples, or a helmet.

Figure 14:
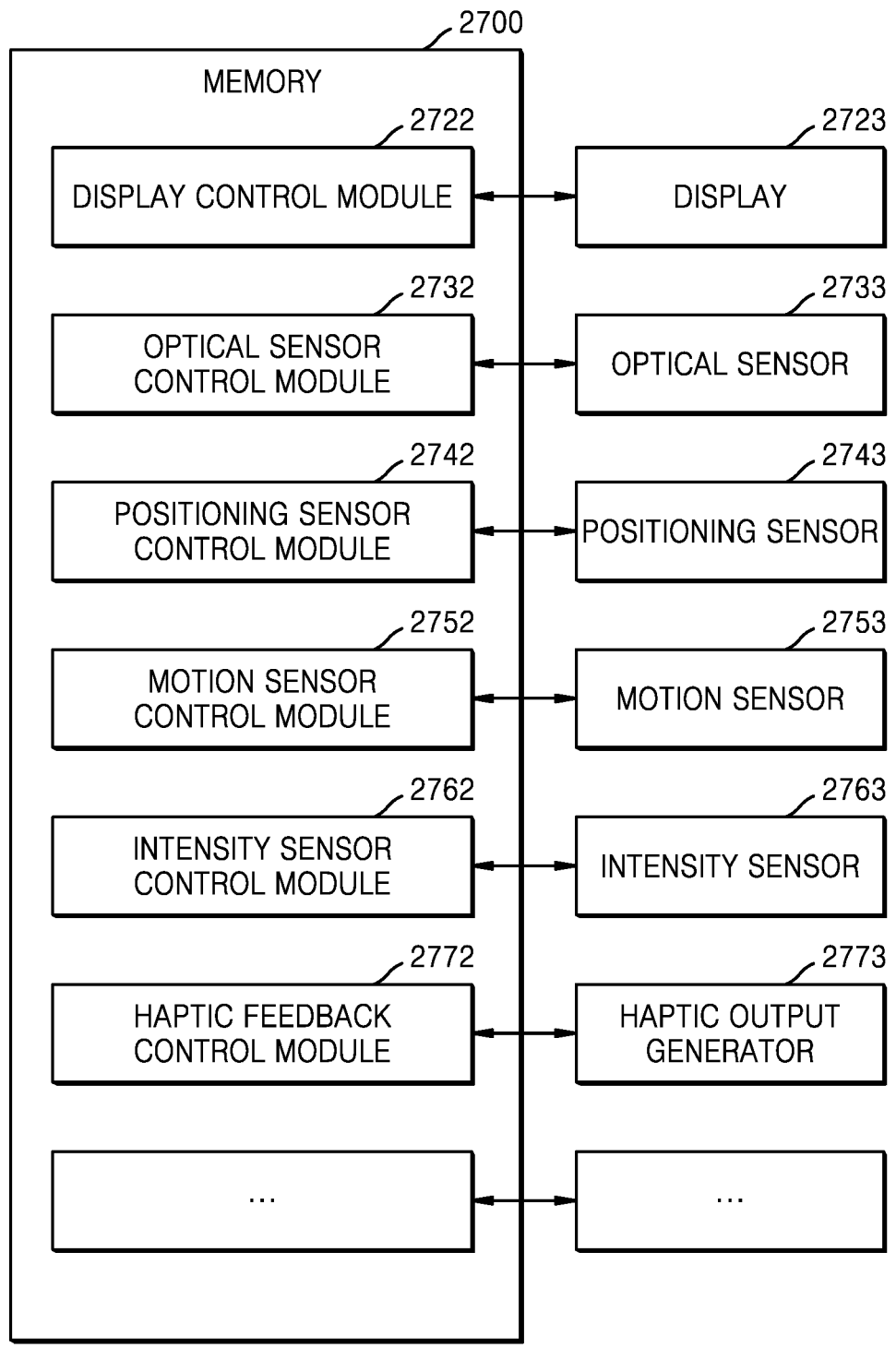
FIG. 14 shows a block diagram for describing a plurality of modules in a memory of an external device, according to an embodiment of the disclosure.

FIG. 14 shows a block diagram for describing the plurality of modules in the memory 2700 of the external device 2000, according to an embodiment of the disclosure.

According to an embodiment of the disclosure, the memory 2700 of the external device 2000 may include a display control module 2722, an optical sensor control module 2732, a positioning sensor control module 2742, a motion sensor control module 2752, an intensity sensor control module 2762, and a haptic feedback control module 2772.

For example, the display control module 2722 may include a plurality of instructions for controlling a display included in the output interface of the external device 2000. For example, the processor 2300 of the external device 2000 may control the display in the external device 2000 by executing the instructions included in the display control module 2722. According to an embodiment of the disclosure, the optical sensor control module 2732 may include instructions for controlling the at least one optical lens included in the external device 2000. For example, the optical sensor control module 2732 may include instructions for controlling at least one of an elevation angle, an azimuth angle, or a rotational angle of a lens, appropriate for the content for the VR output on a display screen of the electronic device 1000. The processor 2300 may control an optical sensor 2733 of the external device 2000 by using the optical sensor control module 2732.

The positioning sensor control module 2742 may include instructions for detecting a current position of the electronic device 1000 or the external device 2000 in the content for the VR. For example, the processor 2300 may identify the position of the electronic device 1000 or the external device 2000 in the content for the VR, by controlling a positioning sensor 2743 by using the positioning sensor control module 2742. The motion sensor control module 2752 may include instructions for obtaining, by using a motion sensor 2753, motion information about a gesture of the user. For example, the processor 2300 may obtain the motion information about the gesture of the user of the external device 2000, by controlling the motion sensor 2753 by using the motion sensor control module 2752.

The intensity sensor control module 2762 may include instructions for measuring a contact intensity of a user input of touching the user input interface 2100 of the external device 2000. For example, the processor 2300 may identify the degree of contact intensity of the user input of touching the user input interface 2100 of the external device 2000, by controlling a contact intensity sensor 2763 by using the intensity sensor control module 2762.

The haptic feedback control module 2772 may include instructions for providing haptic feedback (e.g., vibration) to the user with respect to the content for the VR. For example, the processor 2300 may enable the user of the electronic device 1000 to have a tactile experience (vibration) as a feedback response, by controlling the tactile output generator 2773 by using the haptic feedback control module 2772.

FIG. 11 shows a block diagram of the electronic device 1000 according to an embodiment of the disclosure.

According to an embodiment of the disclosure, the electronic device 1000 may include a user input interface 1100, an output interface 1200, a processor 1300, a sensor 1400, a communication interface 1500, an audio/video (A/V) input interface 1600, a memory 1700 and a power supply (not shown).

Since an output interface 1200, a processor 1300, a sensor portion 1400, a communication interface 1500, an audio/video (A/V) input interface 1600 and a memory 1700 of the electronic device 1000 illustrated in FIG. 15 may correspond to a portion already described in FIG. 11, its detailed description will be omitted.

Figure 16:
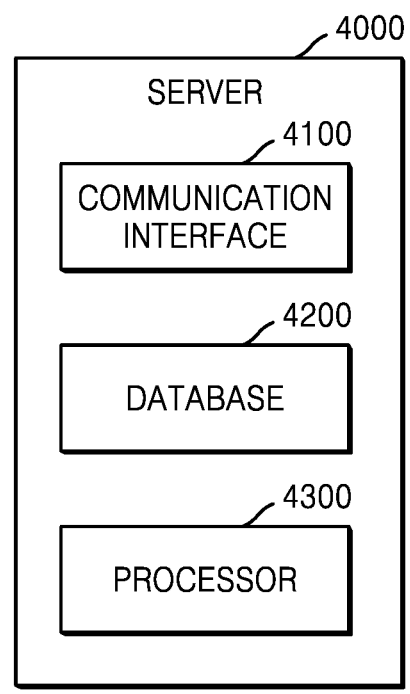
FIG. 16 shows a block diagram of a server connected to an electronic device, according to an embodiment of the disclosure.

FIG. 16 shows a block diagram of a server 4000 connected to the electronic device 1000, according to an embodiment of the disclosure.

According to an embodiment of the disclosure, the server 4000 may include a communication interface 4100, a database 4200, and a processor 4300.

The communication interface 4100 may obtain a request for transmitting the content for the VR from the electronic device 1000, or may transmit the content for the VR to the electronic device 1000 based on the request for transmitting the content for the VR from the electronic device 1000, under control of the processor 4300.

According to an embodiment of the disclosure, the communication interface 4100 may transmit, to the electronic device 1000, at least a portion of content stored in a VRD content database 4210 pre-stored in the database 4200 of the server 4000, or at least one or more of a plurality of VD models stored in a VRD template database 4220, under control of the processor 4300.

The database 4200 may include at least one of the VRD content database 4210 storing at least one piece of content for VR or the VRD template database 4220 storing the one or a plurality of VD models. According to an embodiment of the disclosure, the database 4200 may further store audio information and other visual information for reproducing the content for the VR.

The processor 4300 may control general operations of the server 4000. For example, the processor 4300 may control general operations of the communication interface 4100 and the database 4200 by executing the programs stored in the database 4200 of the server 4000. The processor 4300 may perform one or more of the operations of the electronic device 1000 and the external device 2000 described in FIGS. 1 through 15, by executing the programs stored in the database 4200.

Figure 17:
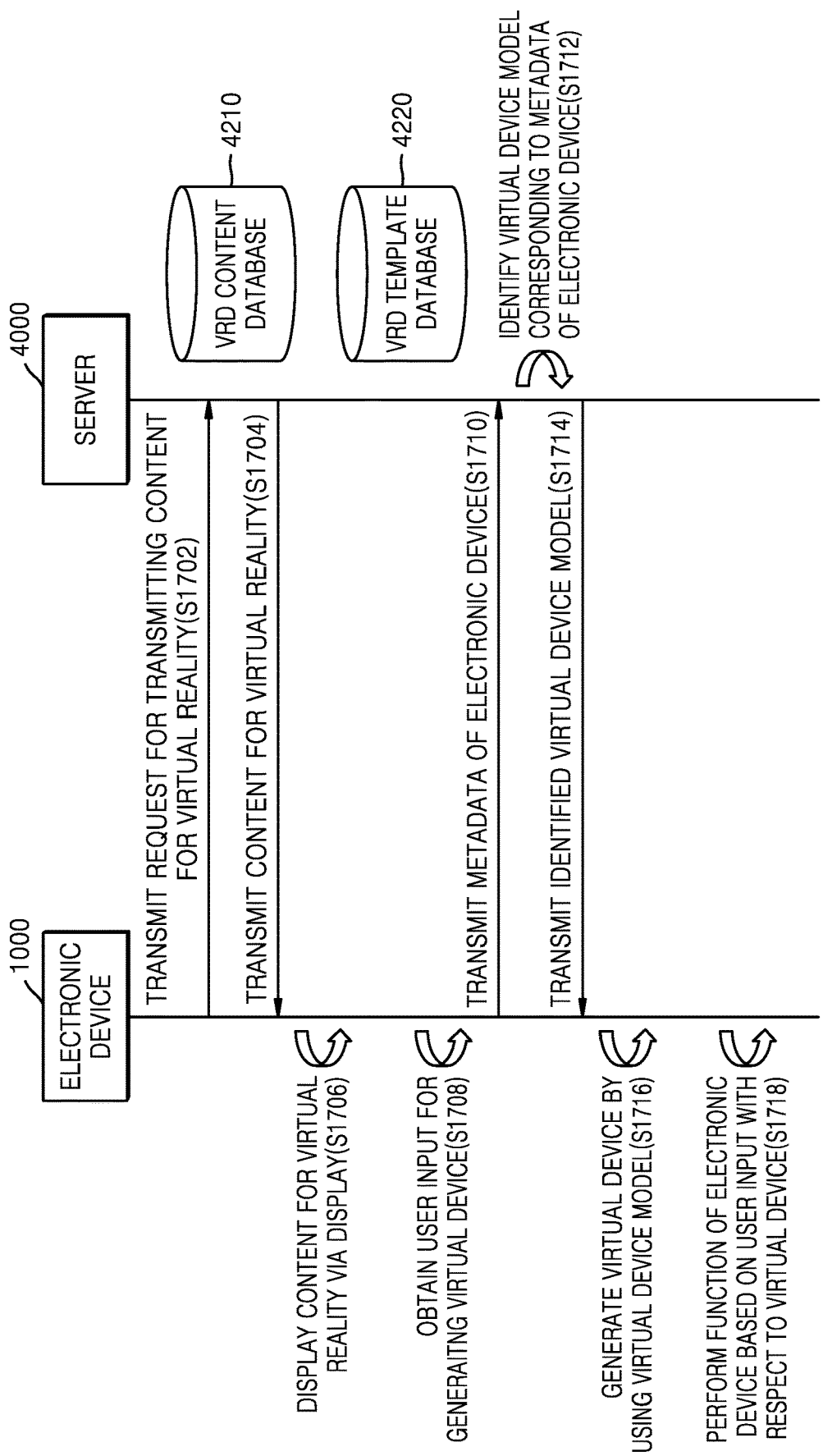
FIG. 17 shows a block diagram for describing a method of providing a virtual device via at least a portion of content, based on interworking between an electronic device and a server, according to an embodiment of the disclosure.

FIG. 17 shows a block diagram for describing a method of providing the VD 1002 via at least a portion of content, based on interworking between the electronic device 1000 and the server 4000, according to an embodiment of the disclosure.

In operation S1702, the electronic device 1000 may transmit a request for transmitting content for VR to the server 4000. In operation S1704, the server 4000 may transmit the content for the VR stored in the VRD content database 4210 stored in the server 4000 in advance, to the electronic device 1000, based on the request for transmitting the content for the VR.

In operation S1706, the electronic device 1000 may display the content for the VR obtained from the server 4000 on a display of the electronic device 1000. In operation S1708, the electronic device 1000 may obtain a user input for generating the VD 1002. For example, the electronic device 1000 may obtain the user input for generating the VD 1002, via the user input interface 1100 of the electronic device 1000. However, the electronic device 1000 may obtain the user input for generating the VD 1002, obtained via the user input interface 2100 of the external device 2000 in which the electronic device 1000 is mounted.

In operation S1710, the electronic device 1000 may transmit metadata of the electronic device 1000 to the server 4000. For example, the metadata may include other identification information for identifying the electronic device 1000. The identification information for identifying the electronic device 1000 included in the metadata may be a device identifier and may uniquely identify the electronic device 1000. According to an embodiment of the disclosure, the identification information may include at least one of a serial number of the electronic device 1000 or a media access control (MAC) address of the electronic device 1000.

Also, according to an embodiment of the disclosure, the metadata of the electronic device 1000 may include at least one piece of hardware and screen cast data related to the hardware. Also, the metadata of the electronic device 1000 may include software components of the electronic device 1000, which may be encoded by using one of the video compression standards, such as, a block oriented motion-compensation-based video compression standard (e.g., H.264, or MPEG-4 part 10, Advanced Video Coding (AVC), etc.

In operation S1712, the server 4000 may identify a VD model corresponding to the metadata obtained from the electronic device 1000. According to an embodiment of the disclosure, the server 4000 may identify one VD model from among the one or the plurality of VD models stored in the VRD template database 4220, based on the metadata obtained from the electronic device 1000.

According to an embodiment of the disclosure, the VRD template database 4220 may include information about at least one of: the number of virtual central processing units, the capacity of the memory, the size of the local file system, or the disk space allocated to an instance for generating the VD 1002.

In operation S1714, the server 4000 may transmit the identified VD model to the electronic device 1000. In operation S1716, the electronic device 1000 may generate the VD 1002 by using the VD model obtained from the server 4000. In operation S1718, the electronic device 1000 may perform the at least one function of the electronic device 1000 based on a user input with respect to the VD 1002.

The method, which may be performed by the electronic device, of providing the VD associated with the electronic device, via at least a portion of the content displayed on the electronic device, according to an embodiment of the disclosure, may be implemented in the form of a program command that may be executed through various computer means, and may be recorded in a computer-readable recording medium. The computer-readable recording medium may include one or more of: program commands, data files, or data structures, or the like, alone or in combination. The program commands recorded on the computer-readable recording medium may be those specially designed and configured for the disclosure or may be available to one of ordinary skill in the art of computer software. Also, a computer program apparatus including the recording medium storing the computer program to execute the method, performed by the electronic device, of providing the VD associated with the electronic device, via the at least a portion of the content displayed on the electronic device, may be provided.

Examples of the computer-readable recording medium may include magnetic media such as hard disks, floppy disks, and magnetic tapes, optical media such as CD-ROMs and DVDs, magneto-optical media such as floptical disks, and hardware devices specifically configured to store and execute program commands, such as read only memory (ROM), random access memory (RAM), flash memory, and the like. Examples of the program command include machine language code such as one produced by a compiler, as well as high-level language code that may be executed by a computer using an interpreter or the like.

The one or more embodiments of the disclosure may be embodied as a recording medium including instructions executable by a computer, such as program modules executed by computers. The computer-readable medium may include any usable medium that may be accessed by computers and may include volatile and non-volatile media, and detachable and non-detachable media. Also, the computer-readable medium may include a computer storage medium and a communication medium. The computer storage medium may include all of volatile and non-volatile media, and detachable and non-detachable media which are realized based on any methods and technologies to store information including computer-readable instructions, data structures, program modules, or other data. The communication medium may typically include computer-readable instructions, data structures, program modules, other data of modified data signals, such as carrier waves, other transmission mechanisms, or other information transmission media. Also, the one or more embodiments of the disclosure may be embodied as a computer program or a computer program product including instructions executable by a computer.

While the embodiments of the disclosure have been described in detail, it will be understood by one of ordinary skill in the art that various changes in form and details may be made therein without departing from the spirit and scope of the disclosure as defined by the following claims.

What is claimed is:

1. A method comprising:
 displaying, by an electronic device, virtual reality content on a display of the electronic device;
 generating, by the electronic device, a virtual device for controlling at least one function of the electronic device, wherein the virtual device is rendered in virtual reality in a form corresponding to the electronic device;
 displaying, by the electronic device, a graphical user interface (GUI) corresponding to a GUI of the electronic device, on a screen of the virtual device;

displaying, by the electronic device, the virtual device on the display of the electronic device in such a way that the virtual device is displayed on at least a portion of the virtual reality content; and performing the at least one function of the electronic device, based on a user input with respect to the virtual device, wherein the performing of the at least one function of the electronic device comprises:

obtaining a request for voice call from an external electronic device, performing a call function with the external electronic device based on the request for the voice call, obtaining a user input for sharing call content of the voice call, based on the user input for sharing the call content, identifying another virtual device that is located within a range of a certain distance from the virtual device, wherein the other virtual device is displayed on the virtual reality content, and transmitting information about the call content to the identified other virtual device.

2. The method of claim 1, further comprising: transmitting, by the electronic device, at least information related to the virtual reality content to an external head-mounted display device.

3. The method of claim 1, wherein the method further comprises:

obtaining a user input for the generating of the virtual device;

identifying a virtual device model corresponding to metadata of the electronic device, from among one or more pre-stored virtual device models, based on the user input for the generating of the virtual device; and generating the virtual device by using the identified virtual device model.

4. The method of claim 1, wherein the generating of the virtual device comprises:

identifying whether or not the electronic device is connected to an external head-mounted display device via a connection port of the external head-mounted display device; and based on identifying that the electronic device is connected to the external head-mounted display device, generating the virtual device based on a user input for the generating of the virtual device.

5. The method of claim 1, wherein the performing of the call function with the external electronic device comprises:

based on the obtained request for the voice call, displaying a pre-set telephone call image on the screen of the virtual device and simultaneously outputting a notification signal with respect to the request for the voice call to an external head-mounted display device.

6. The method of claim 1, wherein the performing of the at least one function of the electronic device comprises:

obtaining a user input for selecting a camera application displayed on the screen of the virtual device;

executing the camera application based on the user input for selecting the camera application; and displaying at least a portion of the virtual reality content, which is to be captured based on the virtual device, on the screen of the virtual device, as a captured virtual image.

7. The method of claim 1, wherein the performing of the at least one function of the electronic device comprises:

obtaining a user input for selecting a message application displayed on the screen of the virtual device;

executing the message application, which is pre-stored in the electronic device, based on the user input for selecting the message application; and displaying, on the screen of the virtual device, text instructed by a graphical user interface (GUI) for obtaining text.

8. The method of claim 1, wherein the at least one function of the electronic device is executed, based on the user input with respect to the virtual device, in the electronic device together with an operation of displaying, on the display of the electronic device, the virtual reality content.

9. An electronic device comprising:

a display;

a communication interface;

a memory storing one or more instructions; and at least one processor configured to execute the one or more instructions to:

control the display to display virtual reality content;

generate a virtual device for controlling at least one function of the electronic device, wherein the virtual device is rendered in virtual reality in a form corresponding to the electronic device;

control the display to display a graphical user interface (GUI) corresponding to a GUI of the electronic device, on a screen of the virtual device;

control the display to display the virtual device in such a way that the virtual device is displayed on at least a portion of the virtual reality content; and perform the at least one function of the electronic device, based on a user input with respect to the virtual device, wherein the at least one processor is further configured to execute the one or more instructions to:

obtain a request for a voice call from an external electronic device, perform a call function with the external electronic device based on the request for the voice call, obtain a user input for sharing call content of the voice call, based on the user input for sharing the call content, identify another virtual device that is located within a range of a certain distance from the virtual device, wherein the other virtual device is displayed on the virtual reality content, and control the communication interface to transmit information about the call content to the identified other virtual device.

10. The electronic device of claim 9, wherein the electronic device is mounted on an external head-mounted display device including at least one lens, is electrically connected to the external head-mounted display device via a connection port of the external head-mounted display device, and the at least one processor is further configured to transmit at least information related to the virtual reality content to the external head-mounted display device.

11. The electronic device of claim 9, wherein the at least one processor is further configured to execute the one or more instructions to:

generate the virtual device by:

obtaining a user input for the generating of the virtual device;

identifying a virtual device model corresponding to metadata of the electronic device, from among one or more pre-stored virtual device models, based on the user input for the generating of the virtual device; and generating the virtual device by using the identified virtual device model.

12. The electronic device of claim 9, wherein the at least one processor is further configured to execute the one or more instructions to:

identify whether or not the electronic device is connected to an external head-mounted display device via a connection port of the external head-mounted display device; and based on identifying that the electronic device is connected to the external head-mounted display device, generate the virtual device based on a user input for the generating of the virtual device.

13. The electronic device of claim 9, wherein the at least one processor is further configured to execute the one or more instructions to:

based on the obtained request for the voice call, control the display to display a pre-set telephone call image on the screen of the virtual device and simultaneously output a notification signal with respect to the request for the voice call to an external head-mounted display device.

14. The electronic device of claim 9, wherein the at least one processor is further configured to execute the one or more instructions to:

obtain a user input for selecting a camera application displayed on the screen of the virtual device;

execute the camera application based on the user input for selecting the camera application; and control the display to display at least a portion of the virtual reality content, which is to be captured based on the virtual device, on the screen of the virtual device, as a captured virtual image.

15. The electronic device of claim 9, wherein the at least one processor is further configured to:

obtain a user input for selecting a message application displayed on the screen of the virtual device;

execute the message application, pre-stored in the electronic device, based on the user input for selecting the message application; and control the display to display, on the screen of the virtual device, text instructed through a graphical user interface (GUI) for obtaining text.

16. A non-transitory computer readable medium comprising computer program instructions that, when executed by a processor of an electronic device, causes the processor to:

control a display of the electronic device to display virtual reality content;

generate a virtual device for controlling at least one function of the electronic device, wherein the virtual device is rendered in virtual reality in a form corresponding to the electronic device;

control the display to display a graphical user interface (GUI) corresponding to a GUI of the electronic device, on a screen of the virtual device;

control the display to display the virtual device in such a way that the virtual device is displayed on at least a portion of the virtual reality content; and perform the at least one function of the electronic device based on a user input for manipulating the virtual device, wherein the computer program instructions, when executed by the processor of the electronic device, cause the processor to:

obtain a request for voice call from an external electronic device, perform a call function with the external electronic device based on the request for the voice call, obtain a user input for sharing call content of the voice call, based on the user input for sharing the call content, identify another virtual device that is located within a range of a certain distance from the virtual device, wherein the other virtual device is displayed on the virtual reality content, and control a communication interface of the electronic device to transmit information about the call content to the identified other virtual device.

* * * * *